US011168231B2

United States Patent
Fan et al.

(10) Patent No.: US 11,168,231 B2
(45) Date of Patent: Nov. 9, 2021

(54) COATING COMPOSITION

(71) Applicant: Covestro Intellectual Property GmbH & Co. KG, Leverkusen (DE)

(72) Inventors: Zhirong Fan, Langenfeld (DE); Xuedong Li, Shanghai (CN); Huimin Ye, Shanghai (CN); Su Juan Zhai, Shanghai (CN)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 17/056,083

(22) PCT Filed: Jun. 12, 2019

(86) PCT No.: PCT/EP2019/065358
§ 371 (c)(1),
(2) Date: Nov. 17, 2020

(87) PCT Pub. No.: WO2019/238760
PCT Pub. Date: Dec. 19, 2019

(65) Prior Publication Data
US 2021/0230448 A1   Jul. 29, 2021

(30) Foreign Application Priority Data

Jun. 15, 2018 (CN) .......................... 201810626599.8
Jul. 23, 2018 (EP) ..................................... 18184990

(51) Int. Cl.
| | |
|---|---|
| *C09D 175/08* | (2006.01) |
| *C08G 18/12* | (2006.01) |
| *C08G 18/44* | (2006.01) |
| *C08G 18/48* | (2006.01) |
| *C08G 18/73* | (2006.01) |
| *C08G 18/75* | (2006.01) |
| *C08G 18/80* | (2006.01) |
| *C08K 5/29* | (2006.01) |
| *C08K 5/3492* | (2006.01) |
| *C09D 133/08* | (2006.01) |
| *C09D 175/06* | (2006.01) |

(52) U.S. Cl.
CPC ........... *C09D 175/08* (2013.01); *C08G 18/12* (2013.01); *C08G 18/44* (2013.01); *C08G 18/4833* (2013.01); *C08G 18/73* (2013.01); *C08G 18/758* (2013.01); *C08G 18/8016* (2013.01); *C08K 5/29* (2013.01); *C08K 5/34922* (2013.01); *C09D 133/08* (2013.01); *C09D 175/06* (2013.01); *C08G 2150/00* (2013.01)

(58) Field of Classification Search
None
See application file for complete search history.

(56) References Cited

U.S. PATENT DOCUMENTS

| | | | |
|---|---|---|---|
| 5,629,402 A | 5/1997 | Pedain et al. | |
| 7,981,821 B2 | 7/2011 | Lomax et al. | |
| 9,006,499 B2 | 4/2015 | Lorenz et al. | |
| 9,783,701 B2 | 10/2017 | Dorr et al. | |
| 2003/0195293 A1 | 10/2003 | Lubnin et al. | |
| 2016/0039967 A1* | 2/2016 | Rukavina ............. | C09D 175/04 428/174 |

FOREIGN PATENT DOCUMENTS

| | | |
|---|---|---|
| EP | 0916647 A2 | 5/1999 |
| EP | 1426391 A1 | 6/2004 |
| JP | 2012077255 A | 4/2012 |
| WO | WO 2011132581 A1 | 10/2011 |
| WO | WO 2018114838 A1 | 6/2018 |

OTHER PUBLICATIONS

International Search Report, PCT/EP2019/065358, dated Sep. 23, 2019, Authorized officer: Martin Sütterlin.

* cited by examiner

*Primary Examiner* — Robert T Butcher
(74) *Attorney, Agent, or Firm* — Jed C. Benson

(57) ABSTRACT

The present invention relates to a coating composition, a coating system comprising the coating composition, a coating method and application of the coating system, and a product coated with the coating system. The coating composition comprises: (A) at least one aqueous polyurethane dispersion and/or one aqueous polyacrylate dispersion, wherein the aqueous polyurethane dispersion comprises at least one polyurethane polymer (a), wherein the polyurethane polymer (a) is obtained by a reaction comprising at least one polyurethane prepolymer (a1) and at least one isocyanate-reactive component (a2), wherein the polyurethane prepolymer (a1) is obtained by a reaction comprising the following components: (a1-1) at least one polyisocyanate having an isocyanate functionality of no less than 2, and (a1-2) at least one polyfunctional polyether polyol having a hydroxyl functionality of no less than 3, wherein the polyfunctional polyether polyol has an amount of 1 wt % to 20 wt %, based on the amount of the components for preparing the polyurethane prepolymer being 100 wt %, and (B) at least one crosslinking agent.

18 Claims, No Drawings

COATING COMPOSITION

CROSS-REFERENCE TO RELATED APPLICATION

This application is a national stage application under 35 U.S.C. § 371 of PCT/EP2019/065358, filed Jun. 12, 2019, which claims the benefit of European Application No. 18184990.2, filed Jul. 23, 2018, and Chinese Application No. 201810626599.8, filed Jun. 15, 2018, each of which is incorporated herein by reference.

TECHNICAL FIELD

The present invention relates to a coating composition, a coating system comprising the coating composition, a coating method and application of the coating system, and a product coated with the coating system.

BACKGROUND

"Water-proof and moisture-permeable" refers to the fact that when a fabric is worn, the external water does not enter the fabric, but the sweat emitted by the human body can be transferred to the outside through the fabric in the form of water vapor, so that the wearer feels dry and comfortable. In recent years, water-proof and moisture-permeable fabrics have become popular because of their water-proof and moisture-permeable properties, especially in the field of outdoor clothing and sports shoes.

Water-proof and moisture-permeable fabrics generally include three categories: microporous water-proof and moisture-permeable fabrics, coated water-proof and moisture-permeable fabrics, and laminated water-proof and moisture-permeable composite fabrics. Coated water-proof and moisture-permeable coated fabrics have become the main development direction of water-proof and moisture-permeable fabrics due to their simple processing.

The coating composition used to form a coated water-proof and moisture-permeable fabric may be polytetrafluoroethylene, polyester, polyamide or polyurethane. Among them, a coating formed on the fabric by coating a coating composition comprising an aqueous polyurethane dispersion does not allow water droplets such as rainwater to pass through, but individual water molecules are able to pass through by means of molecular diffusion motion. Therefore, the coating composition comprising an aqueous polyurethane dispersion can be used to produce coated water-proof and moisture-permeable fabrics. Furthermore, the coated water-proof and moisture-permeable fabric formed by using the coating composition containing an aqueous polyurethane dispersion has excellent properties such as wear resistance, chemical resistance, and low temperature resistance, and thereby is widely investigated and applied.

EP 1426391 A1 discloses an aqueous polyurethane dispersion prepared from components of an isocyanate-terminated polyurethane prepolymer containing an ionic hydrophilic group and an isocyanate-terminated polyurethane prepolymer containing a nonionic hydrophilic group. The aqueous polyurethane dispersion is mixed with an organic solvent such as N-methylpyrrolidone to obtain a coating composition.

U.S. Pat. No. 5,629,402 discloses a coating composition comprising a polyurethane and an organic solvent such as N-methylpyrrolidone, wherein the polyurethane contains ionic groups and polyethylene oxide units.

In the aforementioned two patent documents, the coating compositions contain an organic solvent. The toxicity of organic solvents not only damages the health of operators, but also damages the health of fabric wearers.

The industry has therefore begun to study coating compositions containing an aqueous polyurethane dispersion.

US 2003/0195293 A1 discloses an aqueous polyurethane dispersion comprising polyalkylene oxide side chain units and a polyethylene oxide backbone unit, wherein the amount of the polyalkylene oxide side chain units is 12 wt % to 80 wt %, and the amount of the polyethylene oxide backbone unit is less than 25 wt %, based on the amount of the aqueous polyurethane dispersion being 100 wt %. The alkylene oxide groups in the polyalkylene oxide side chain units have 2 to 10 carbon atoms and are unsubstituted and/or substituted. The alkylene oxide groups contain no less than 50 wt % of ethylene oxide. The coating formed by the above aqueous polyurethane dispersion can have a water vapor transmission rate of up to 500 gms/m$^2$/24 h.

WO 2006/075144 A1 discloses an aqueous polyurethane dispersion prepared from components of diisocyanate, diamine and polyether polyol. The polyether polyol contains $(CH_2)_m O$-units, wherein m may be the same or different and m is 3 or 4. The amount of the polyether polyol is no less than 70 wt %, the amount of ether oxygen atoms in the polyether polyol is no less than 15 wt %, and the amount of terminal amine groups of the aqueous polyurethane dispersion is no more than 0.2 wt %, based on the amount of the solid polyurethane being 100 wt %.

WO 2011/132581 A1 discloses an aqueous polyurethane dispersion prepared from an isocyanate-terminated prepolymer and a chain extender. The isocyanate-terminated prepolymer is obtained by reacting polytetrahydrofuran, an oxyethylene group-containing polyol, a branched alkylene group-containing alkylene glycol, an isocyanate, and any carboxyl group-containing polyol.

JP 2012/077255 discloses an aqueous polyurethane dispersion prepared from the following components: 50 wt % or more of a polyisocyanate without multiple rings (for example, without any aromatic ring or any aliphatic ring, or with only one aromatic ring or only one aliphatic ring), and a polyethoxylated polyol having a dendritic structure. The polyethoxylated polyol has two hydroxyl and/or isocyanate groups as terminal groups and polyethoxy groups on side chains. The aqueous polyurethane dispersion obtained is difunctional and has a dendritic structure.

WO 2013/037767 A2 discloses an aqueous polyurethane dispersion obtained by reacting a polyurethane prepolymer with an isocyanate-reactive compound. The polyurethane prepolymer is obtained by the reaction of polyols and polyisocyanates. The polyols are polyester polyols and the polyisocyanates contain no less than 50 wt % of dicyclohexylmethane diisocyanate based on the total weight of the polyisocyanates. The isocyanate-reactive compound contains sulfonate groups.

However, the aforementioned coating compositions containing an aqueous polyurethane dispersion comprise a large amount of hydrophilic groups, which, on one hand, makes it difficult to disperse the polyurethane polymer in water, and makes it prone to gelation so that it is difficult to form an aqueous polyurethane dispersion; and on the other hand, increases the viscosity of the aqueous polyurethane dispersion and decreases the solid content, so that the coating formed by the coating composition becomes thinner and its performance reduces.

Therefore, there is a need in the art for a coating composition that provides a coating showing good hand-felt softness, anti-sticking and washing resistance.

SUMMARY OF THE INVENTION

The term "aqueous polyurethane dispersion" also serves as a synonym for the aqueous polyurethaneurea dispersion and/or aqueous polyurethane polyurea dispersion and/or aqueous polyurea dispersion.

The object of the present invention is to provide a coating composition, a coating system comprising the coating composition, a coating method and application of the coating system, and a product coated with the coating system.

A coating composition according to the present invention comprises:
(A) at least one aqueous polyurethane dispersion and/or one aqueous polyacrylate dispersion, wherein the aqueous polyurethane dispersion comprises at least one polyurethane polymer (a), wherein the polyurethane polymer (a) is obtained by a reaction comprising at least one polyurethane prepolymer (a1) and at least one isocyanate-reactive component (a2), wherein the polyurethane prepolymer (a1) is obtained by a reaction comprising the following components:
(a1-1) at least one polyisocyanate having an isocyanate functionality of no less than 2,
(a1-2) at least one polyfunctional polyether polyol having a hydroxyl functionality of no less than 3, wherein the polyfunctional polyether polyol has an amount of 1 wt % to 20 wt %, based on the amount of the components for preparing the polyurethane prepolymer being 100 wt %, and
(a1-3) optionally a polymer polyol different from the polyfunctional polyether polyol having a hydroxyl functionality of no less than 3;
(B) at least one crosslinking agent; and
(C) optionally an additive.

According to one aspect of the present invention, there is provided a method for preparing a coating composition provided according to the invention, the method comprising the step of: mixing the aqueous polyurethane dispersion and/or the aqueous polyacrylate dispersion (A), the crosslinking agent (B) and the optional additive (C) in any desired manner.

According to one aspect of the present invention, there is provided use of a coating composition provided according to the present invention for producing a coated product.

According to one aspect of the present invention, there is provided a coated product comprising a substrate and a coating formed by coating a coating composition provided according to the present invention on the substrate.

According to one aspect of the present invention, there is provided a coated product comprising a substrate and a coating formed by curing a coating composition provided according to the present invention.

According to one aspect of the present invention, there is provided a method for producing a coated product, the method comprising the steps of coating a coating composition provided according to the present invention on a substrate and curing it to form a coating.

According to one aspect of the present invention, there is provided a coating system comprising:
a first composition, the first composition being a coating composition provided according to the present invention, wherein the polymer polyol (a1-3) different from the polyfunctional polyether polyol having a hydroxyl functionality of no less than 3 comprises at least one polycarbonate polyol, and the weight ratio of the polyfunctional polyether polyol (a1-2) having a hydroxyl functionality of no less than 3 to the polycarbonate polyol is 1:4 to 1:10, wherein the first composition is used to form a first coating, and
a second composition, the second composition being a coating composition provided according to the present invention, wherein the polymer polyol (a1-3) different from the polyfunctional polyether polyol having a hydroxyl functionality of no less than 3 comprises at least one polyester polyol, and the weight ratio of the polyfunctional polyether polyol (a1-2) having a hydroxyl functionality of no less than 3 to the polyester polyol is 1:20 to 1:80, wherein the second composition is used to form a second coating.

According to one aspect of the present invention, there is provided use of a coating system provided according to the present invention for producing a coated article.

According to one aspect of the present invention, there is provided a coated article comprising a substrate and a coating formed by coating a coating system provided according to the present invention on the substrate.

According to one aspect of the present invention, there is provided a coated article comprising a substrate and a coating formed by curing a coating system provided according to the present invention.

According to one aspect of the present invention, there is provided a method for producing a coated article, the method comprising the steps of coating a coating system provided according to the present invention onto a substrate and curing it to form a coating.

The coating formed by a coating composition of the present invention, especially that comprising an aqueous polyurethane dispersion obtained by a reaction comprising a polyfunctional polyether polyol, particularly the polyether polyol having a hydroxyl functionality of 6 and a star-shaped structure, and a suitable amount of an cycloaliphatic polyisocyanate, has good hand-felt softness, anti-sticking and washing resistance.

The coating formed by a coating system of the present invention has good hand-felt softness, anti-sticking and washing resistance.

DETAILED DESCRIPTION

The present invention provides a coating composition comprising:
(A) at least one aqueous polyurethane dispersion and/or one aqueous polyacrylate dispersion, wherein the aqueous polyurethane dispersion comprises at least one polyurethane polymer (a), wherein the polyurethane polymer (a) is obtained by a reaction comprising at least one polyurethane prepolymer (a1) and at least one isocyanate-reactive component (a2), wherein the polyurethane prepolymer (a1) is obtained by a reaction comprising the following components:
(a1-1) at least one polyisocyanate having an isocyanate functionality of no less than 2,
(a1-2) at least one polyfunctional polyether polyol having a hydroxyl functionality of no less than 3, wherein the polyfunctional polyether polyol has an amount of 1 wt % to 20 wt %, based on the amount of the components for preparing the polyurethane prepolymer being 100 wt %, and
(a1-3) optionally a polymer polyol different from the polyfunctional polyether polyol having a hydroxyl functionality of no less than 3;

(B) at least one crosslinking agent; and
(C) optionally an additive.

The present invention also provides a coating system comprising the coating composition, a coating method and application of the coating system, and a product coated with the coating system.

A coating composition comprises:
(A) at least one aqueous polyurethane dispersion, wherein the aqueous polyurethane dispersion comprises at least one polyurethane polymer (a), wherein the polyurethane polymer (a) is obtained by a reaction comprising at least one polyurethane prepolymer (a1) and at least one isocyanate-reactive component (a2), wherein the polyurethane prepolymer (a1) is obtained by a reaction comprising the following components:
(a1-1) at least one polyisocyanate having an isocyanate functionality of no less than 2,
(a1-2) at least one polyfunctional polyether polyol having a hydroxyl functionality of no less than 3, wherein the polyfunctional polyether polyol has an amount of 1 wt % to 20 wt %, based on the amount of the components for preparing the polyurethane prepolymer being 100 wt %, and
(a1-3) optionally a polymer polyol different from the polyfunctional polyether polyol having a hydroxyl functionality of no less than 3;
(B) at least one crosslinking agent; and
(C) optionally an additive.

The present invention also provides a coating system comprising the coating composition, a coating method and application of the coating system, and a product coated with the coating system.

Aqueous Polyurethane Dispersion (A)

The aqueous polyurethane dispersion has an amount of preferably 50 wt % to 99 wt %, more preferably 70 wt % to 99 wt %, most preferably 90 wt % to 99 wt %, based on the amount of the coating composition being 100 wt %.

Polyurethane Polymer (a)
Polyurethane Prepolymer (a1)
Polyisocyanate (a1-1)

The polyisocyanate of the present invention may be one or a combination of more of the polyisocyanates described below.

The polyisocyanate has an amount of preferably 5 wt % to 70 wt %, more preferably 5 wt % to 40 wt %, further preferably 5 wt % to 35 wt %, most preferably 10 wt % to 30 wt %, based on the amount of the components for preparing the polyurethane prepolymer being 100 wt %.

The polyisocyanate has a functionality of preferably 2-5, most preferably 2-4.

The polyisocyanate is preferably one or more of the following: an aliphatic polyisocyanate, a cycloaliphatic polyisocyanate and an aromatic polyisocyanate, more preferably one or more of the following: an aliphatic polyisocyanate and a cycloaliphatic polyisocyanate, most preferably a cycloaliphatic polyisocyanate.

The cycloaliphatic polyisocyanate preferably comprises at least two aliphatic rings.

The cycloaliphatic polyisocyanate has an amount of preferably 25 wt % to 90 wt %, based on the amount of the polyisocyanate being 100 wt %.

The cycloaliphatic polyisocyanate has an amount of most preferably 50 wt % to 85 wt %, based on the amount of the polyisocyanate being 100 wt %.

The aliphatic polyisocyanate is preferably one or more of the following: hexamethylene diisocyanate (HDI), 2,2-dimethylpentane diisocyanate, 2,2,4-trimethylhexane diisocyanate, butylene diisocyanate, 1,3-butadiene-1,4-diisocyanate, 2,4,4-trimethyl-1,6-hexane diisocyanate, 1,6,11-undecane triisocyanate, 1,3,6-hexamethylene triisocyanate, 1,8-diisocyanato-4-methylisocyanatooctane, bis(ethylisocyanato) carbonate, bis(ethylisocyanato)ether, lysine diisocyanate methyl ester and lysine triisocyanate, most preferably hexamethylene diisocyanate (HDI).

The cycloaliphatic polyisocyanate is preferably one or more of the following: isophorone diisocyanate (IPDI), isomeric bis(4,4'-isocyanatocyclohexyl)methane or mixtures thereof having any desired isomer content, 1,4-cyclohexylene diisocyanate, 1,3-bis(isocyanatomethyl)benzene (XDI), 1,3- and/or 1,4-bis(2-isocyanatoprop-2-yl)-benzene (TMXDI), norbornane diisocyanate (NBDI), hydrogenated xylylene diisocyanate ($H_6$XDI), 1,4-cyclohexyl diisocyanate ($H_6$PPDI), 1,5-pentane diisocyanate (PDI) and dicyclohexylmethane diisocyanate, most preferably dicyclohexylmethane diisocyanate.

The aromatic polyisocyanate is preferably one or more of the following: toluene diisocyanate (TDI), 2,4- and/or 2,6-toluene diisocyanate, 1,5-naphthylene diisocyanate, diphenylmethane-2,2'-diisocyanate, diphenylmethane-2,4'-diisocyanate, diphenylmethane-4,4'-diisocyanate, hydrogenated toluene diisocyanate ($H_6$TDI) and 1,4-phenylene diisocyanate, most preferably one or more of the following: toluene diisocyanate (TDI), diphenylmethane-2,2'-diisocyanate, diphenylmethane-2,4'-diisocyanate and diphenylmethane-4,4'-diisocyanate.

The polyisocyanate may also be modified polyisocyanates having uretdione, isocyanurate, urethane, allophanate, biuret, imino-oxadiazinedione and/or oxadiazinetrione structures.

Polyfunctional Polyether Polyol (a1-2) Having a Hydroxyl Functionality of No Less than 3

The polyfunctional polyether polyol of the present invention may be one or a combination of more of the polyfunctional polyether polyols described below.

The polyfunctional polyether polyol may have a number-average molecular weight of 500 g/mol to 12,000 g/mol, preferably 500 g/mol to 6000 g/mol, determined by gel permeation chromatography using tetrahydrofuran as the mobile phase and control polystyrene standards at 23° C.

The polyfunctional polyether polyol has a functionality of preferably 3-8, more preferably 3-6 and most preferably 6.

The polyfunctional polyether polyol has an amount of preferably 1 wt % to 15 wt %, more preferably 1 wt % to 12 wt %, and most preferably 1 wt % to 10 wt %, based on the amount of the components for preparing the polyurethane prepolymer being 100 wt %.

The polyfunctional polyether polyol is preferably obtained by a reaction comprising at least one ethylene oxide and at least one initiator. For the preparation of the polyfunctional polyether polyol, see CN 104004176 A.

The reaction temperature for preparing the polyfunctional polyether polyol may be 70° C. to 170° C., preferably 100° C. to 160° C.

It is preferred not to use any solvent or other auxiliary agents in the reaction for preparing the polyfunctional polyether polyol.

According to the present invention, "not to use any solvent or other auxiliary agents" should be understood as "not to actively introduce any solvent or other auxiliary agents"; and trace amount of any solvent or auxiliary agents remaining during the preparation from ethylene oxide and/or initiator is not considered to be the use of any solvent or auxiliary agents.

Since the initiator is generally a solid at room temperature, it may also be used in the form of an aqueous solution to facilitate the reaction for preparing the polyfunctional polyether polyol. Dehydration may be carried out prior to the start of the ethylene oxide addition or after the end of the ethylene oxide addition. A method used for dehydration may be stripping.

The reaction for preparing the polyfunctional polyether polyol may further comprise at least one catalyst.

The catalyst may have an amount of 0.004 wt % to 1.0 wt %, preferably 0.02 wt % to 1.0 wt %, based on the amount of the components for preparing the polyfunctional polyether polyol being 100 wt %.

The catalyst is preferably a basic catalyst. The basic catalyst is preferably one or more of the following: an alkali metal hydride, an alkali metal carboxylate, an alkali metal hydroxide, an alkali metal alkoxide and an amine.

The alkali metal carboxylate is preferably a monofunctional alkali metal carboxylate.

The alkali metal hydroxide is preferably one or more of the following: sodium hydroxide, potassium hydroxide and cesium hydroxide, most preferably potassium hydroxide.

The alkali metal alkoxide is preferably an alkali metal alkoxide of a monofunctional alcohol.

The amine is preferably one or more of the following: N,N-dimethylbenzylamine, dimethylaminopropanol, N-methyldiethanolamine, trimethylamine, triethylamine, N,N-dimethylcyclohexylamine, N-methylpyrrolidine, N,N,N',N'-tetramethylethanediamine, diazabicyclo[2,2,2]octane, 1,4-dimethylpiperazine, N-methylmorpholine, unsubstituted imidazole and an alkyl-substituted imidazole derivative, most preferably imidazole and/or an alkyl-substituted imidazole derivative.

The alkyl-substituted imidazole derivative is preferably N-methylimidazole.

The amount of ethylene oxide is selected such that the oxyethylene groups of the polyfunctional polyether polyol have a content of preferably 18 wt % to 100 wt %, more preferably 30 wt % to 85 wt %, based on the amount of the polyfunctional polyether polyol being 100 wt %.

The reaction for preparing the polyfunctional polyether polyol may further comprise at least one alkylene oxide different from ethylene oxide.

The alkylene oxide different from ethylene oxide is preferably one or more of the following: propylene oxide, 1-epoxybutane, 2,3-epoxybutane, 2-methyl-1,2-epoxypropane (isobutylene oxide), 1-epoxypentane, 2,3-epoxypentane, 2-methyl-1,2-epoxybutane, 3-methyl-1,2-epoxybutane, 1-epoxyhexane, 2,3-epoxyhexane, 3,4-epoxyhexane, 2-methyl-1,2-epoxypentane, 4-methyl-1,2-epoxypentane, 2-ethyl-1,2-epoxybutane, 1-epoxyheptane, 1-epoxyoctane, 1-epoxynonane, 1-epoxydecane, 1-epoxyundecane, 1-epoxydodecane, 4-methyl-1,2-epoxypentane, butadiene monooxide, isoprene monooxide, cyclopentene oxide, cyclohexene oxide, cycloheptene oxide, cyclooctene oxide, styrene oxide, methylstyrene oxide, and pinene oxide, most preferably propylene oxide and/or butylene oxide.

The initiator may be an initiator having a melting point of no less than 40° C. The initiator having a melting point of no less than 40° C. is preferably one or more of the following: monosaccharides, oligosaccharides, polysaccharides, pentaerythritol, dipentaerythritol, tripentaerythritol, trimethylolethane, trimethylolpropane, sorbitol, a cyclic polyol, an aromatic hydroxy compound, a polyamine, a compound having carboxyl groups and a compound having hydroxyl and carboxyl groups.

The cyclic polyol is preferably inositol.

The aromatic hydroxy compound is preferably one or more of the following: phenols, hydroquinone, catechol, resorcinol, 1,3,5-trihydroxybenzene, bisphenol A, bisphenol F, the hydroxymethyl-containing condensation product of formaldehyde and phenols or melamine or urea, a Mannich base and a high-functional compound based on hydrogenated starch hydrolysates.

The polyamine is preferably based on the condensation products of high-functional polycyclic anilines and formaldehyde and/or the isomers of toluene diamine.

The compound having carboxyl groups is preferably one or more of the following: malonic acid, glutaric acid, and adipic acid.

The compound having hydroxyl and carboxyl groups is preferably one or more of the following: hydroxybenzoic acid isomers, hydroxymethylbenzoic acid isomers, dihydroxybenzoic acid isomers, trihydroxybenzoic acid isomers, mandelic acid, malic acid, citric acid, tartaric acid and mucic acid.

The initiator having a melting point of no less than 40° C. is more preferably one or more of the following: pentaerythritol, sucrose, trimethylolpropane and sorbitol, and most preferably sorbitol.

The initiator may also be an initiator having a melting point of less than 40° C. The initiator having a melting point of less than 40° C. is preferably one or more of the following: methanol, ethanol, 1-propanol, 2-propanol, aliphatic monools that are liquid at room temperature, 1,2-propanediol, 1,3-propanediol, ethylene glycol, diethylene glycol, dipropylene glycol, 1,2-butanediol, 1,3-butanediol, 1,4-butanediol, hexanediol, pentanediol, 3-methyl-1,5-pentanediol, glycerol, triethanolamine and water.

The initiator having a melting point of no less than 40° C. may also be used in combination with the initiator having a melting point of less than 40° C.

When the initiator having a melting point of no less than 40° C. is used in combination with the initiator having a melting point of less than 40° C., the initiator having a melting point of no less than 40° C. has an amount of preferably no less than 70 wt %, and the initiator having a melting point of less than 40° C. has an amount of preferably no more than 30 wt %, based on the amount of the initiators used being 100 wt %.

The polyfunctional polyether polyol having a hydroxyl functionality of no less than 3 preferably has the structure of formula I:

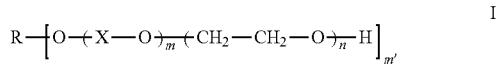

wherein
m is 0-50,
n is 1-50,
m' is no less than 3,
X is one or more of the following: 1,3-propylidene, 1,2-isopropylidene (—CH(CH$_3$)CH$_2$—), 2,2-propylidene (—C(CH$_3$)$_2$—), 1,1-butylidene, 1,2-butylidene, 2,2-butylidene, 1,3-butylidene, 1,4-butylidene, 1,2-pentylidene, 1,3-pentylidene, 1,4-pentylidene, 1,5-pentylidene, 1,6-hexylidene, 1,7-heptylidene, 1,8-octylidene, 1,9-nonylidene, 1,10-decylidene, 1,11-undecylidene, 1,12-dodecylidene, 1,2-cyclopentylidene, 1,2-cyclohexylidene, 1,2-cycloheptylidene, 1,2-cyclooctylidene, 1,2-styrylidene, 1,2-methylstyrylidene, and 1,2-pinanylidene; R is C$_y$H$_z$, wherein y is equal to the number of carbon atoms of the initiator, and z is an integer that renders formula I established.

The m is preferably 0-10, most preferably 1-3.

The n is preferably 1-10, most preferably 7-10.

The m' is preferably 3-8, more preferably 3-6, and most preferably 6.

The X is preferably one or more of the following: 1,3-propylidene, 1,2-isopropylidene ($-CH(CH_3)CH_2-$), 2,2-propylidene ($-C(CH_3)_2-$), 1,1-butylidene, 1,2-butylidene, 2,2-butylidene, 1,3-butylidene, and 1,4-butylidene.

The polyfunctional polyether polyol having a hydroxyl functionality of no less than 3 is preferably a polyol having a functionality of 6 and a star-shaped structure.

The polyfunctional polyether polyol having a hydroxyl functionality of no less than 3 is most preferably polyoxyethylene polyol and/or polyoxypropylene polyol having a functionality of 6.

Polymer Polyol (a1-3) Different from the Polyfunctional Polyether Polyol Having a Hydroxyl Functionality of No Less than 3

The polymer polyol of the present invention may be one or a combination of more of the polymer polyols described below.

The polymer polyol different from the polyfunctional polyether polyol having a hydroxyl functionality of no less than 3 may be one or more of polyester polyols, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polycarbonate polyether polyols, polyurethane polycarbonate polyols and polyester polycarbonate polyols, preferably one or more of the following: polycarbonate polyols, polyester polyols and low-functional polyether polyols, most preferably polycarbonate polyols and/or polyester polyols, commonly used in the preparation of an aqueous polyurethane dispersion.

Polycarbonate Polyol

The weight ratio of the polyfunctional polyether polyol having a hydroxyl functionality of no less than 3 to the polycarbonate polyol is preferably 1:4 to 1:10, most preferably 1:4 to 1:8.

The polycarbonate polyol has a number-average molecular weight of preferably 400 g/mol to 8000 g/mol, most preferably 600 g/mol to 3000 g/mol.

The polycarbonate polyol has a hydroxyl value of preferably 20 mg KOH/g to 100 mg KOH/g.

The polycarbonate polyol is preferably a hydroxyl-containing polycarbonate, most preferably a polycarbonate diol.

The polycarbonate diol can be obtained by reacting a carbonic acid derivative such as diphenyl carbonate or dimethyl carbonate with a polyol, preferably a diol.

The diol is preferably ethylene glycol, 1,2- and 1,3-propanediol, 1,3- and 1,4-butanediol, 1,6-hexanediol, 1,8-octylene glycol, neopentyl glycol, 1,4-bishydoxylmethylcyclohexane, 2-methyl-1,3-propanediol, 2,2,4-trimethyl-1,3-pentanediol, dipropylene glycol, polypropylene glycol, dibutylene glycol, polybutylene glycol, bisphenol A, or lactone-modified diols of the above type.

The diol is most preferably hexanediol. The hexanediol is preferably 1,6-hexanediol and/or a hexanediol derivative. The 1,6-hexanediol derivative contain an ester or ether group in addition to the hydroxyl end group, and can be obtained from hexanediol and an equal or excess amount of caprolactone, or obtained by self-etherification of hexanediol to produce di- or tri-hexanediol.

The polycarbonate diol has a hydroxyl value of preferably 25 mg KOH/g to 250 mg KOH/g, most preferably 50 mg KOH/g to 70 mg KOH/g.

The polycarbonate diol has a number-average molecular weight of preferably 500 g/mol to 4,000 g/mol, most preferably 1,000 g/mol to 2,500 g/mol.

The polycarbonate diol is most preferably Desmophen C2200 available from Covestro Co., Ltd., Germany.

Polyester Polyol

The weight ratio of the polyfunctional polyether polyol to the polyester polyol is preferably 1:20 to 1:80, and most preferably 1:30 to 1:70.

The polyester polyol has a hydroxyl value of preferably 20 mg KOH/g to 100 mg KOH/g.

The polyester polyol is preferably a linear polyester diol or a lightly branched polyester polyol, and prepared by a reaction comprising the following components: aliphatic, cycloaliphatic or aromatic di- or polycarboxylic acids, for example succinic acid, methyl succinic acid, glutaric acid, adipic acid, pimelic acid, suberic acid, azelaic acid, sebacic acid, nonanedicarboxylic acid, decanedicarboxylic acid, terephthalic acid, isophthalic acid, phthalic acid, tetrahydrophthalic acid, hexahydrophthalic acid, cyclohexane dicarboxylic acid, maleic acid, fumaric acid, malonic acid or trimellitic acid; anhydrides, such as phthalic anhydride, trimellitic anhydride or succinic anhydride or mixtures thereof; and low molecular weight polyols, and optionally polyols having a higher functionality, such as trimethylolpropane, glycerol or pentaerythritol, cycloaliphatic and/or aromatic di- and poly-hydroxy compounds.

The low molecular weight polyol is preferably a linear low molecular weight polyol and/or a branched low molecular weight diol.

The linear low molecular weight polyol is preferably one or more of the following: one or more of 1,2-ethanediol (glycol), 1,3-propanediol, 1,4-butanediol, 1,5-pentanediol, 1,6-hexanediol, 1,7-heptanediol, 1,8-octylene glycol, 1,9-nonanediol, 1,10-decanediol, and 1,3-butanediol. 1,3- and 1,4-butanediol, 1,6-hexanediol and 1,8-octylene glycol are preferred.

The branched low molecular weight polyol is preferably one or more of the following: neopentyl glycol, 1,2-propanediol, 2-methyl-1,2-propanediol, 2-methyl-1,3-propanediol, 1,2-butanediol, meso-2,3-butanediol, 2,3-dimethyl-2,3-butanediol, 1,2-pentanediol, 2,3-pentanediol, 2,4-pentanediol, 1,4-pentanediol, 2,2,4-trimethyl-1,3-pentanediol, 1,3-hexanediol, 1,4-hexanediol, 1,5-hexanediol, 2,5-hexanediol, 2,5-dimethyl-2,5-hexanediol, 1,3-cyclobutanediol, 2,2,4,4-tetramethylcyclobutanediol, 1,2-cyclopentanediol, 1,3-cyclopentanediol, 1,3-dimethyl-1,3-cyclopentanediol, 1,2-cyclohexanediol, 1,3-cyclohexanediol, 1,4-cyclohexanediol and 1,4-dimethylolcyclohexane, most preferably one or more of the following: neopentyl glycol, methyl-1,3-propanediol and 2,2,4-trimethyl-1,3-pentanediol.

The polyester polyol may also be a homopolymer or a heteropolymer of lactone(s), and obtained preferably by the addition of a lactone or a mixture of lactones, such as butyrolactone, ε-caprolactone and/or methyl-ε-caprolactone, to a suitable starter molecule having a functionality of two or more. The ε-caprolactone is preferably a polymer of ε-caprolactone.

The polyester polyol has a hydroxyl value of preferably 25 mg KOH/g to 250 mg KOH/g, most preferably 50 mg KOH/g to 70 mg KOH/g.

The polyester polyol has a number-average molecular weight of preferably 500 g/mol to 4,000 g/mol, most preferably 1,000 g/mol to 2,500 g/mol.

The polyester polyol is most preferably Desmophen PE 170 HN available from Covestro Co., Ltd., Germany.

Low-Functional Polyether Polyol The term "low-functional polyether polyol" should generally be understood as a polyether polyol having a hydroxyl functionality of no more than 2.

The low-functional polyether polyol has an amount of preferably 0 to 20 wt %, most preferably 5 to 20 wt %, based on the amount of the components for preparing the polyurethane prepolymer being 100 wt %.

The low-functional polyether polyol has a hydroxyl value of preferably 50 mg KOH/g to 700 mg KOH/g, most preferably 100 mg KOH/g to 600 mg KOH/g.

The low-functional polyether polyol has a number-average molecular weight of preferably 400 g/mol to 4,000 g/mol, most preferably 400 g/mol to 3,500 g/mol, determined by gel permeation chromatography using tetrahydrofuran as the mobile phase and control polystyrene standards at 23° C.

The low-functional polyether polyol is preferably one or more of the following: polyaddition products of alkylene oxides, condensation products of polyols or polyol mixtures or alkoxylation products of polyfunctional alcohols, amines and amino alcohols.

The polyaddition products of alkylene oxides are preferably one or more of the following: the polyaddition products of ethylene oxide, 1,2-propylene oxide, 1,2-butylene oxide, 2,3-butylene oxide, tetrahydrofuran, chlorinated styrene or epichlorohydrin, as well as their mixed addition products and grafted products.

When the low-functional polyether polyol has a functionality of 2, the low-functional polyether polyol is preferably the alkoxylation products of a hydroxy-functional starter molecule, such as ethylene glycol, 1,2-propanediol, 1,3-propanediol, 1,4-butanediol, hexanediol, diethylene glycol, trimethylolpropane, glycerol, pentaerythritol, sorbitol, or mixtures thereof, with propylene oxide or butylene oxide.

The low-functional polyether polyol having a functionality of 2 is preferably soluble in water.

The low-functional polyether polyol having a functionality of 2 is preferably Desmophen® L300 and/or Desmophen® 3600.

When the low-functional polyether polyol has a functionality of 1, the polyether polyol is preferably a non-ionic hydrophilic monofunctional polyether polyol.

The nonionic hydrophilic monofunctional polyether polyol is preferably a monofunctional alkoxy polyethylene polyol such as polyethylene glycol monomethyl ether, a monofunctional monoalkyl ether polyether polyol or a monofunctional polyetheramine.

The polyethylene glycol monomethyl ether is preferably MPEG Carbowax® 2000 and/or Methoxy PEG-40, having a number-average molecular weight of preferably 1,800 to 2,200 g/mol and available from Dow Chemical Company.

The monofunctional monoalkyl ether polyether polyol is preferably LB25, obtained from components comprising butanol, ethylene oxide and propylene oxide and having a number-average molecular weight of 2,250 g/mol, available from Covestro Co., Ltd.

The monofunctional polyetheramine is preferably Jeffamine® M1000 and/or Jeffamine® M2070, both available from the Huntsman Company.

The non-ionic hydrophilic monofunctional polyether polyol is more preferably one or more of the following: MPEG Carbowax® 2000, LB25 and Jeffamine® M2070, most preferably MPEG Carbowax® 2000 and/or LB25.
Hydroxy-Functional Compound (a1-4) Having a Molecular Weight of 32 g/Mol to 400 g/Mol The components for preparing the polyurethane prepolymer may further comprise a hydroxy-functional compound having a molecular weight of 32 g/mol to 400 g/mol.

The hydroxy-functional compound of the present invention may be one or a combination of more of the hydroxy-functional compounds described below.

The hydroxy-functional compound has an amount of 0 to 8 wt %, based on the amount of the components for preparing the polyurethane prepolymer being 100 wt %.

The hydroxy-functional compound is preferably one or more of the following: a polyol having no more than 20 carbon atoms, an ester diol, and a monofunctional or isocyanate-reactive hydroxyl-functional compound.

The polyol having no more than 20 carbon atoms is preferably one or more of the following: ethylene glycol, diethylene glycol, triethylene glycol, 1,2-propanediol, 1,3-propanediol, 1,4-butanediol, 1,3-butanediol, cyclohexanediol, 1,4-cyclohexanedimethanol, 1,6-hexanediol, neopentyl glycol, hydroquinone dihydroxyethyl ether, bisphenol A (2,2-bis(4-hydroxyphenyl)propane), hydrogenated bisphenol A (2,2-bis(4-hydroxycyclohexyl)propane), trimethylolpropane, glycerol, and pentaerythritol.

The ester diol is preferably one or more of the following: α-hydroxybutyl-ε-hydroxyhexanoate, ω-hydroxyhexyl-γ-hydroxybutyrate, β-hydroxyethyl adipate or β-hydroxyethyl terephthalate.

The monofunctional or isocyanate-reactive hydroxy-functional compound is preferably one or more of the following: ethanol, n-butanol, ethylene glycol monobutyl ether, diethylene glycol monomethyl ether, ethylene glycol monobutyl ether, diethylene glycol monobutyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol, 1-hexadecanol, 1,6-hexanediol, 1,4-butanediol, neopentyl glycol, and trimethylolpropane, most preferably one or more of the following: 1,6-hexanediol, 1,4-butanediol, neopentyl glycol, and trimethylolpropane.
Isocyanate-Reactive Component (a2)

The isocyanate-reactive component of the present invention may be one or a combination of more of the isocyanate-reactive components described below.

The isocyanate-reactive component has an amount of preferably 0.1 to 65 wt %, more preferably 0.1 to 25 wt %, further preferably 0.1 to 15 wt %, and most preferably 0.1 to 13.5 wt %, based on the amount of the components for preparing the polyurethane polymer being 100 wt %.

The isocyanate-reactive component may react with all or a portion of the free isocyanate groups (NCO) of the polyurethane prepolymer to undergo chain extension.

The isocyanate-reactive groups of the isocyanate-reactive component are preferably amine groups and/or hydroxyl groups.

The isocyanate-reactive component is preferably an amino compound having an amino functionality of no less than 1.

The amino compound has an amino functionality of preferably 1-3, most preferably 2.

The amino compound has an amount of preferably 0.1 wt % to 10 wt %, based on the amount of the components for preparing the polyurethane polymer being 100 wt %.

The isocyanate-reactive component is preferably one or more of the following: an anionic hydrophilic agent and a potentially anionic hydrophilic agent.

The anionic hydrophilic agent and/or the potentially anionic hydrophilic agent is preferably one or more of the following: compounds comprising sulfonium, ammonium, phosphonium, carboxylate, sulfonate, phosphonate groups or those which can be converted into the above groups by salt formation.

The anionic hydrophilic agent and/or the potentially anionic hydrophilic agent is preferably one or more of the following: mono- and dihydroxy carboxylic acids, mono- and diamino carboxylic acids, mono- and dihydroxy sulfonic acids, mono- and diamino sulphonic acids and mono- and dihydroxy phosphonic acids or mono- and diamino phosphonic acids and their salts. Examples include dimethylolpropionic acid, dimethylolbutanoic acid, hydroxypentanoic acid, N-(2-aminoethyl)-β-alanine, 2-(2-aminoethyl-amino)ethanesulfonic acid, ethanediamine-propyl- or -butyl sulfonic acid, 1,2- or 1,3-propanediamine-β-ethyl sulfonic acid, malic acid, citric acid, glycolic acid, lactic acid, glycine, alanine, taurine, lysine, 3,5-diaminobenzoic acid, IPDI and adducts of acrylic acid (see EP-A0916647, Example 1) and alkali and/or ammonium salts thereof, the adduct of sodium bisulfite on but-2-ene-1,4-diol, polyether sulfonates or the propoxylated adduct of 2-butanediol and $NaHSO_3$.

The anionic hydrophilic agent and/or the potentially anionic hydrophilic agent is more preferably one or more of the following: mono- and dihydroxy carboxylic acids, mono- and diamino carboxylic acids, mono- and dihydroxy sulfonic acids, mono- and diamino sulphonic acids and their salts, most preferably one or more of the following: salts having a functionality of 1.9-2.1 and containing sulphonate groups as ions or potentially ionic groups, such as salts of N-(2-aminoethyl)-alanine, salts of 2-(2-aminoethylamino)ethanesulfonic acid, or salts of the adduct of IPDI and acrylic acid.

Amino-Functional Compound (a3) Having a Molecular Weight of 32-400 g/Mol

The components for preparing the polyurethane polymer preferably further comprise at least one amino-functional compound having a molecular weight of 32 g/mol to 400 g/mol. The amino-functional compound having a molecular weight of 32 g/mol to 400 g/mol is generally used as a chain terminator.

The amino-functional compound of the present invention may be one or a combination of more of the amino-functional compounds described below.

The amino-functional compound has an amount of preferably 0 to 5 wt %, based on the amount of the components for preparing the polyurethane polymer being 100 wt %.

The amino-functional compound having a molecular weight of 32 g/mol to 400 g/mol is preferably one or more of the following: ethanediamine, 1,2- and 1,3-diaminopropane, 1,4-diaminobutane, 1,6-diaminohexane, isophorone diamine, isomeric mixtures of 2,2,4- and 2,4,4-trimethylhexamethylene-diamine, 8-methylpentamethylenediamine, diethylenetriamine, 1,3- and 1,4-xylenediamine, a,a,a',a'-tetramethyl-1,3- and -1,4-xylylenediamine, 4,4-diaminodicyclohexylmethane and dimethylethanediamine.

Neutralizing Agent (a4)

The components for preparing the polyurethane polymer preferably further comprise at least one neutralizing agent.

The neutralizing agent of the present invention may be one or a combination of more of the neutralizing agents described below.

The neutralizing agent has an amount of preferably 0 to 2 wt %, based on the amount of the components for preparing the polyurethane polymer being 100 wt %.

The neutralizing agent is preferably one or more of the following: ammonia, ammonium carbonate, bicarbonates, trimethylamine, triethylamine, tributylamine, diisopropylethylamine, dimethylethanolamine, diethylethanolamine, triethanolamine, lithium hydroxide, sodium hydroxide, potassium hydroxide, and sodium carbonate, more preferably one or more of the following: triethylamine, triethanolamine, dimethylethanolamine, sodium hydroxide, potassium hydroxide and diisopropylethylamine, most preferably one or more of the following: sodium hydroxide and potassium hydroxide.

Method for Preparing an Aqueous Polyurethane Dispersion (A)

According to a preferred embodiment of the present invention, the aqueous polyurethane dispersion is prepared by the following steps:

(1) reacting a mixture comprising at least one polyisocyanate (a1-1), at least one polyfunctional polyether polyol (a1-2) having a hydroxyl functionality of no less than 3, optionally a polymer polyol (a1-3) different from the polyfunctional polyether polyol having a hydroxyl functionality of no less than 3 and optionally a hydroxy-functional compound (a1-4) having a molecular weight of 32 g/mol to 400 g/mol to obtain the polyurethane prepolymer (a1);

(2) reacting a mixture comprising at least one polyurethane prepolymer (a1), at least one isocyanate-reactive component (a2) and optionally an amino-functional compound (a3) having a molecular weight of 32 g/mol to 400 g/mol to obtain the polyurethane polymer (a); and (3) introducing water before, during, or after step (2) to obtain the aqueous polyurethane dispersion (A).

It is preferred to introduce water after step (2) to obtain the aqueous polyurethane dispersion.

The aqueous polyurethane dispersion may be prepared by a prepolymer mixing method, an acetone method, or a melt dispersion method, preferably using an acetone method.

In the acetone method, all or part of the components of step (1) are initially charged to prepare a polyurethane prepolymer, and the mixture is optionally diluted with a solvent that is water miscible but inert to isocyanate groups, and heated to a temperature of 50-120° C.

In order to accelerate the reaction rate of step a, it is possible to use a catalyst commonly used in the preparation of polyurethane prepolymers, such as dibutyltin dilaurate.

The solvent may be a conventional keto-functional aliphatic solvent such as acetone, 2-butanone. The solvent may be added only at the beginning of the preparation, or it may, if desired, be further added during the preparation.

The solvent may also be one or more of the following: xylene, toluene, cyclohexane, butyl acetate, methoxypropyl acetate, N-methylpyrrolidone, N-ethylpyrrolidone, and solvents containing ether or ester units.

The components of step (1) that were not added at the beginning of the reaction are then metered in.

The components of step (1) are partially or completely converted into a polyurethane prepolymer, preferably completely converted.

The polyurethane prepolymer may be in a solid or liquid state.

If the polyurethane prepolymer obtained is not yet dissolved or only partially dissolved, it is further dissolved by means of an aliphatic ketone such as acetone or 2-butanone.

Any potentially ionic groups present in the polyurethane prepolymer are converted into the ionic form by partial or complete reaction with the neutralizing agent (a4). The degree of neutralization is preferably 50 mol % to 125 mol %, most preferably 70 mol % to 100 mol %.

Neutralization can also be carried out simultaneously with dispersion if the dispersing water has contained a neutralizing agent.

In step (2), the isocyanate-reactive component and optionally the amino-functional compound having a molecular weight of 32-400 g/mol are partially or completely reacted with the residual isocyanate groups of the polyurethane prepolymer obtained in step (1) to undergo chain extension.

The degree of chain extension, i.e. the equivalent ratio of the isocyanate-reactive groups of the compound used for chain extension to the free isocyanate (NCO) groups of the polyurethane prepolymer, is preferably 40 mol % to 100 mol %, most preferably 50 mol % to 100 mol %.

The isocyanate-reactive component and optionally the amino-functional compound having a molecular weight of 32-400 g/mol may optionally be used alone or in a mixture in the form of water dilution or solvent dilution, and the sequence of addition may be any desired.

Water or the solvent has a content of preferably 70 wt % to 95 wt %.

The step (3) may be carried out by using intensive shearing such as intensive stirring.

The solvent present in the aqueous polyurethane dispersion can be removed by distillation. The solvent may be removed during the step (2) or step (3).

The organic solvent remaining in the aqueous polyurethane dispersion has an amount of preferably less than 1.0 wt %, based on the amount of the aqueous polyurethane dispersion being 100 wt %.

The molar ratio of the isocyanate groups of the polyurethane prepolymer to the isocyanate-reactive groups of the isocyanate-reactive component is preferably 1.05-3.5, more preferably 1.2-3.0, and most preferably 1.3-2.5.

Crosslinking Agent (B)

The crosslinking agent of the present invention can react with the active hydrogen-containing groups of the polyurethane polymer, or the crosslinking agent can self-crosslink to form an interpenetrating network.

The crosslinking agent of the present invention may be one or a combination of more of the crosslinking agents described below.

The crosslinking agent is preferably an aliphatic and/or aromatic isocyanate derivative containing a reactive group.

The reactive group can react with a group containing active hydrogen.

The group containing active hydrogen is preferably one or more of the following: hydroxyl, carboxyl, thiol, and amino, most preferably one or more of the following: hydroxyl, carboxyl, and amino.

The reactive group has a content of 0.1 wt % to 2 wt %, preferably 0.1 wt % to 0.5 wt %, based on the amount of the coating composition being 100 wt %.

The crosslinking agent is preferably one or more of the following: a blocked aliphatic polyisocyanate, a non-blocked aliphatic polyisocyanate, a carbodiimide, a melamine-type crosslinking agent, a aziridine-type crosslinking agent and a polyepoxy crosslinking agent, more preferably one or more of the following: a blocked aliphatic polyisocyanate, a non-blocked aliphatic polyisocyanate, and a carbodiimide, most preferably a blocked aliphatic polyisocyanate and a carbodiimide. The weight ratio of the blocked aliphatic polyisocyanate to the carbodiimide is preferably 1:1 to 4:1.

The content of isocyanate groups of the blocked aliphatic polyisocyanate is preferably 10 wt % to 20 wt %, based on the solid content of the blocked aliphatic polyisocyanate being 100 wt %.

The blocked aliphatic polyisocyanate is preferably a hydrophilically modified blocked aliphatic polyisocyanate.

The viscosity of the hydrophilically modified blocked aliphatic polyisocyanate is preferably less than 2,000 mPa·s.

The hydrophilically modified blocked aliphatic polyisocyanate is most preferably Imprafix 2794.

The content of isocyanate groups of the non-blocked aliphatic polyisocyanate is preferably 10 wt % to 20 wt %, based on the solid content of the non-blocked aliphatic polyisocyanate being 100 wt %.

The non-blocked aliphatic polyisocyanate is preferably a hydrophilically modified non-blocked aliphatic polyisocyanate.

The viscosity of the hydrophilically modified non-blocked aliphatic polyisocyanate is preferably 4,000-9,000 mPa·s.

The hydrophilically modified non-blocked aliphatic polyisocyanate is most preferably Imprafix IO 3025.

The NCN group content of the carbodiimide is preferably 2 wt % to 5 wt %, based on the solid content of the carbodiimide being 100 wt %.

The carbodiimide is preferably Desmodur 2802.

The crosslinking agent is preferably hydrophilically modified and/or hydrophilically unmodified, most preferably hydrophilically modified.

The amount of the hydrophilically modified crosslinking agent is preferably 50 wt % to 100 wt %, more preferably 70 wt % to 100 wt %, most preferably 80 wt % to 100 wt %, based on the amount of the crosslinking agent being 100 wt %.

When the crosslinking agent comprises a hydrophilically modified crosslinking agent and a hydrophilically unmodified crosslinking agent, the amount of the hydrophilically unmodified crosslinking agent is preferably 0-30 wt %, most preferably 5-20 wt %, based on the amount of the crosslinking agent being 100 wt %.

The viscosity of the hydrophilically unmodified crosslinking agent is preferably 500 to 1,500 mPa·s.

The hydrophilically unmodified crosslinking agent may be those hydrophilically unmodified and commonly used in the industry, most preferably Desmodur 3900.

Additive (C)

The additive is preferably one or more of the following: co-adhesives, thickeners, adhesion promoters, lubricants, wetting additives, dyes, light stabilizers, aging inhibitors, pigments, flow control agents, anstatic agents, UV-absorbers, film forming aids, defoamers, matting agents and plasticizers.

The amount of the additive is preferably 0.5 wt % to 3 wt %, based on the amount of the coating composition being 100 wt %.

Coated Product

The water vapor transmission rate of the coating is preferably 5,000 g/m$^2$/24 h to 25,000 g/m$^2$/24 h, most preferably 5,000 g/m$^2$/24 h to 10,000 g/m$^2$/24 h, and the hydrostatic pressure is no less than 7,000 mm.

The substrate is preferably wood, plastic, metal, glass, fabric, leather, paper, EVA, rubber, leather, glass fiber, polymer fiber, or graphite fiber, most preferably fabric.

The fabric is preferably wool fabric, cotton fabric, synthetic fabric.

The coating is carried out preferably by spraying, painting, roller coating, dipping, injection, printing or knife coating, most preferably spraying such as air pressure spraying, airless spraying or electrostatic spraying.

Method for Producing a Coated Product

The coating can be performed one or more times, and the coating composition applied each time may be the same or different.

The curing process is preferably performed first at a temperature not higher than 100° C., followed by raising the temperature to 100° C. to 150° C.

Coating System
First Composition
Polyisocyanate (a1-1) of the First Composition

The polyisocyanate of the first composition of the present invention may be one or a combination of more of the polyisocyanates described below.

The polyisocyanate of the first composition preferably comprises at least one cycloaliphatic polyisocyanate.

The cycloaliphatic polyisocyanate is preferably a cycloaliphatic polyisocyanate containing at least two aliphatic rings.

The cycloaliphatic polyisocyanate containing at least two aliphatic rings is preferably dicyclohexylmethane diisocyanate.

The amount of the cycloaliphatic polyisocyanate of the first composition is preferably 25 wt % to 100 wt %, more preferably 25 wt % to 85 wt %, and most preferably 30 wt % to 60 wt %, based on the amount of the polyisocyanate of the first composition being 100 wt %.

The polyisocyanate of the first composition preferably further comprises at least one aliphatic polyisocyanate.

The aliphatic polyisocyanate is preferably one or more of the following: hexamethylene diisocyanate (HDI), 2,2-dimethylpentane diisocyanate, 2,2,4-trimethylhexane diisocyanate, butylene diisocyanate, 1,3-butadiene-1,4-diisocyanate, 2,4,4-trimethyl-1,6-hexane diisocyanate, 1,6,11-undecane triisocyanate, 1,3,6-hexamethylene triisocyanate, 1,8-diisocyanato-4-methylisocyanatooctane, bis(ethylisocyanato) carbonate, bis(ethylisocyanato)ether, lysine diisocyanate methyl ester and lysine triisocyanate, most preferably hexamethylene diisocyanate (HDI).

The polyisocyanate of the first composition may also be modified polyisocyanates having uretdione, isocyanurate, urethane, allophanate, biuret, imino-oxadiazinedione and/or oxadiazinetrione structures.

Polymer Polyol (a1-3) of the First Composition that is Different from the Polyfunctional Polyether Polyol Having a Hydroxyl Functionality of No Less than 3
Polycarbonate Polyol The polycarbonate polyol of the first composition of the present invention may be one or a combination of more of the polycarbonate polyols described below.

The weight ratio of the polyfunctional polyether polyol having a hydroxyl functionality of no less than 3 to the polycarbonate polyol of the first composition is most preferably 1:4 to 1:8.

The polycarbonate polyol has a number-average molecular weight of preferably 400 g/mol to 8,000 g/mol, most preferably 600 g/mol to 3,000 g/mol.

The polycarbonate polyol has a hydroxyl value of preferably 20 mg KOH/g to 100 mg KOH/g.

The polycarbonate polyol is preferably a hydroxyl-containing polycarbonate, most preferably a polycarbonate diol.

The polycarbonate diol can be obtained from a carbonic acid derivative such as diphenyl carbonate or dimethyl carbonate, and a polyol, preferably a diol.

The diol may be ethylene glycol, 1,2- and 1,3-propanediol, 1,3- and 1,4-butanediol, 1,6-hexanediol, 1,8-octylene glycol, neopentyl glycol, 1,4-bishydoxylmethylcyclohexane, 2-methyl-1,3-propanediol, 2,2,4-trimethyl-1,3-pentanediol, dipropylene glycol, polypropylene glycol, dibutylene glycol, polybutylene glycol, bisphenol A, or lactone-modified diols of the above type.

The diol preferably comprises 40 wt % to 100 wt % of hexanediol. The hexanediol is preferably 1,6-hexanediol and/or a hexanediol derivative. The 1,6-hexanediol derivative contain an ester or ether group in addition to the OH end group, and can be obtained from hexanediol and an equal or excess amount of caprolactone, or obtained by self-etherification of hexanediol to produce di- or tri-hexanediol.

The polycarbonate diol has a hydroxyl value of preferably 25 mg KOH/g to 250 mg KOH/g, most preferably 50 mg KOH/g to 70 mg KOH/g.

The polycarbonate diol has a number-average molecular weight of preferably 500 g/mol to 4,000 g/mol, most preferably 1,000 g/mol to 2,500 g/mol.

The polycarbonate diol is most preferably Desmophen C2200 available from Covestro Co., Ltd., Germany.

The polymer polyol of the first composition that is different from the polyfunctional polyether polyol may further comprise one or more of the following: polycarbonate polyols different from the polycarbonate polyol of the first composition described above, polyacrylate polyols, polyurethane polyols, polyester polyols, polyether polyols, polyester polyacrylate polyols, polyurethane polyacrylate polyols, polyurethane polyester polyols, polyurethane polyether polyols, polycarbonate polyether polyols, polyurethane polycarbonate polyols, and polyester polycarbonate polyols; preferably one or more of the following: polyester polyols, polycarbonate polyols different from the polycarbonate polyol of the first composition described above and low-functional polyether polyols.

Crosslinking Agent (B) of the First Composition

The crosslinking agent of the first composition may be a blocked aliphatic polyisocyanate, in an amount of preferably 3 wt % to 10 wt %, based on the amount of the crosslinking agent of the first composition being 100 wt %.

The crosslinking agent of the first composition may be a non-blocked aliphatic polyisocyanate, in an amount of preferably 1 wt % to 10 wt %, based on the amount of the crosslinking agent of the first composition being 100 wt %.

The crosslinking agent of the first composition preferably comprises a blocked aliphatic polyisocyanate and a carbodiimide.

The weight ratio of the blocked aliphatic polyisocyanate to the carbodiimide is 1:1 to 4:1.

The reactive group of the crosslinking agent has a content of 0.1 wt % to 2 wt %, preferably 0.1 wt % to 0.5 wt %, based on the amount of the first composition being 100 wt %.

The blocked aliphatic polyisocyanate is preferably a hydrophilically modified blocked aliphatic polyisocyanate.

The viscosity of the hydrophilically modified blocked aliphatic polyisocyanate is preferably less than 2,000 mPa·s.

The hydrophilically modified blocked aliphatic polyisocyanate is most preferably Imprafix 2794 available from Covestro Co., Ltd., Germany.

The non-blocked aliphatic polyisocyanate is preferably a hydrophilically modified non-blocked aliphatic polyisocyanate.

The viscosity of the hydrophilically modified non-blocked aliphatic polyisocyanate is preferably 4,000-9,000 mPa·s.

The hydrophilically modified non-blocked aliphatic polyisocyanate is most preferably Imprafix IO 3025 available from Covestro Co., Ltd., Germany.

The carbodiimide is preferably Desmodur 2802 available from Covestro Co., Ltd., Germany.

Second Composition

Polyisocyanate (a1-1) of the Second Composition

The polyisocyanate of the second composition of the present invention may be one or a combination of more of the polyisocyanates described below.

The polyisocyanate of the second composition preferably comprises at least one cycloaliphatic polyisocyanate.

The cycloaliphatic polyisocyanate is preferably a cycloaliphatic polyisocyanate containing at least two aliphatic rings.

The cycloaliphatic polyisocyanate containing at least two aliphatic rings is preferably dicyclohexylmethane diisocyanate.

The amount of the cycloaliphatic polyisocyanate of the second composition is preferably 25 wt % to 100 wt %, most preferably 50 wt % to 100 wt %, based on the amount of the polyisocyanate of the second composition being 100 wt %.

The polyisocyanate of the second composition may further comprise at least one aliphatic polyisocyanate.

The aliphatic polyisocyanate is preferably one or more of the following: hexamethylene diisocyanate (HDI), 2,2-dimethylpentane diisocyanate, 2,2,4-trimethylhexane diisocyanate, butylene diisocyanate, 1,3-butadiene-1,4-diisocyanate, 2,4,4-trimethyl-1,6-hexane diisocyanate, 1,6,11-undecane triisocyanate, 1,3,6-hexamethylene triisocyanate, 1,8-diisocyanato-4-methylisocyanatooctane, bis(ethylisocyanato) carbonate, bis(ethylisocyanato)ether, lysine diisocyanate methyl ester and lysine triisocyanate, most preferably hexamethylene diisocyanate (HDI).

The polyisocyanate of the second composition may also be modified polyisocyanates having uretdione, isocyanurate, urethane, allophanate, biuret, imino-oxadiazinedione and/or oxadiazinetrione structures.

Polymer Polyol of the Second Composition that is Different from the Polyfunctional Polyether Polyol Having a Hydroxyl Functionality of No Less than 3

Polyester Polyol

The polyester polyol of the second composition of the present invention may be one or a combination of more of the polyester polyols described below.

The weight ratio of the polyfunctional polyether polyol having a hydroxyl functionality of no less than 3 to the polyester polyol of the second composition is preferably 1:20 to 1:80, and most preferably 1:30 to 1:70.

The polyester polyol has a hydroxyl value of preferably 20 mg KOH/g to 100 mg KOH/g.

The polyester polyol is preferably a linear polyester diol or a lightly branched polyester polyol, and prepared from the following components: aliphatic, cycloaliphatic or aromatic di- or polycarboxylic acids, for example succinic acid, methyl succinic acid, glutaric acid, adipic acid, pimelic acid, suberic acid, azelaic acid, sebacic acid, nonanedicarboxylic acid, decanedicarboxylic acid, terephthalic acid, isophthalic acid, phthalic acid, tetrahydrophthalic acid, hexahydrophthalic acid, cyclohexane dicarboxylic acid, maleic acid, fumaric acid, malonic acid or trimellitic acid; anhydrides, such as phthalic anhydride, trimellitic anhydride or succinic anhydride or mixtures thereof; and low molecular weight polyols, and optionally polyols having a higher functionality, such as trimethylolpropane, glycerol or pentaerythritol, cycloaliphatic and/or aromatic di- and polyhydroxy compounds.

The low molecular weight polyols may be a linear low molecular weight polyol and/or a branched low molecular weight diol.

The linear low molecular weight polyol is selected from one or more of 1,2-ethanediol (glycol), 1,3-propanediol, 1,4-butanediol, 1,5-pentanediol, 1,6-hexanediol, 1,7-heptanediol, 1,8-octylene glycol, 1,9-nonanediol, 1,10-decanediol, and 1,3-butanediol. One or more of 1,3- and 1,4-butanediol, 1,6-hexanediol and 1,8-octylene glycol are preferred.

The branched low molecular weight polyol is selected from one or more of neopentyl glycol, 1,2-propanediol, 2-methyl-1,2-propanediol, 2-methyl-1,3-propanediol, 1,2-butanediol, meso-2,3-butanediol, 2,3-dimethyl-2,3-butanediol, 1,2-pentanediol, 2,3-pentanediol, 2,4-pentanediol, 1,4-pentanediol, 2,2,4-dimethyl-1,3-pentanediol, 1,3-hexanediol, 1,4-hexanediol, 1,5-hexanediol, 2,5-hexanediol, 2,5-dimethyl-2,5-hexanediol, 1,3-cyclobutanediol, 2,2,4,4-tetramethylcyclobutanediol, 1,2-cyclopentanediol, 1,3-cyclopentanediol, 1,3-dimethyl-1,3-cyclopentanediol, 1,2-cyclohexanediol, 1,3-cyclohexanediol, 1,4-cyclohexanediol and 1,4-dimethylolcyclohexane. One or more of neopentyl glycol, methyl-1,3-propanediol and 2,2,4-dimethyl-1,3-pentanediol are preferred.

The polyester polyol may also be a homopolymer or a heteropolymer of lactone(s), and obtained preferably by the addition of a lactone or a mixture of lactones, such as butyrolactone, ε-caprolactone and/or methyl-ε-caprolactone, to a suitable starter molecule having a functionality of two or more. The ε-caprolactone is preferably a polymer of ε-caprolactone.

The polyester polyol has a hydroxyl value of preferably 25 mg KOH/g to 250 mg KOH/g, most preferably 50 mg KOH/g to 70 mg KOH/g.

The polyester polyol has a number-average molecular weight of preferably 500 g/mol to 4,000 g/mol, most preferably 1,000 g/mol to 2,500 g/mol.

The polyester polyol is most preferably Desmophen PE 170 HN available from Covestro Co., Ltd., Germany.

The polymer polyol of the second composition that is different from the polyfunctional polyether polyol may further comprise one or more of the following: polyester polyols different from the polyester polyol of the second composition described above, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polycarbonate polyether polyols, polyurethane polycarbonate polyols, and polyester polycarbonate polyols; preferably one or more of the following: polycarbonate polyols, polyester polyols different from the polyester polyol of the second composition described above and low-functional polyether polyols.

Crosslinking Agent (B) of the Second Composition

The reactive group of the crosslinking agent has a content of 0.1 wt % to 2 wt %, preferably 0.1 wt % to 0.5 wt %, based on the amount of the second composition being 100 wt %.

The blocked aliphatic polyisocyanate is preferably a hydrophilically modified blocked aliphatic polyisocyanate.

The viscosity of the hydrophilically modified blocked aliphatic isocyanate is preferably less than 2,000 mPa·s.

The hydrophilically modified blocked aliphatic isocyanate is most preferably Imprafix 2794 available from Covestro Co., Ltd., Germany.

The non-blocked aliphatic polyisocyanate is preferably a hydrophilically modified non-blocked aliphatic polyisocyanate.

The viscosity of the hydrophilically modified non-blocked aliphatic polyisocyanate is preferably 4,000-9,000 mPa·s.

The hydrophilically modified non-blocked aliphatic polyisocyanate is most preferably Imprafix IO 3025 available from Covestro Co., Ltd., Germany.

The carbodiimide is preferably Desmodur 2802 available from Covestro Co., Ltd., Germany.

Additive (C) of the Second Composition

The additive of the second composition is preferably a matting agent.

The amount of the matting agent is preferably 1 wt % to 3 wt %, based on the amount of the second composition being 100 wt %. The matting agent may be present in the form of a solution, where the amount of the matting agent refers to the solid content of the matting agent.

The matting agent is preferably silica.

Third Composition

The coating system may further comprise at least one third composition.

The third composition preferably comprises an aqueous dispersion, and is different from the first or second composition. The third composition is used to form a third coating.

The aqueous dispersion is preferably one or more of the following: an aqueous polyacrylate dispersion, an aqueous polyurethane dispersion, an aqueous polyvinyl alcohol dispersion, an aqueous polyether dispersion, an aqueous polyester dispersion and an aqueous fatty acid ester dispersion.

The third composition may further comprise at least one additive. The additive may be one or more selected from the group consisting of pigments such as organic pigments, inorganic pigments, metallic pigments or pearlescent pigments, wetting agents, matting agents, defoamers, film formers, thickeners and other additives that are well known to the skilled in the art and can be added to the third composition.

The amount of the additive may be an amount that can be added by the skilled in the art.

The third composition may further comprise at least one crosslinking agent. The crosslinking agent may be a crosslinking agent that is well known to the skilled in the art and can be added to the third composition.

Coated Article

The water vapor transmission rate of the coating is preferably 3000 g/m$^2$/24 h to 25,000 g/m$^2$/24 h, most preferably 3,500 g/m$^2$/24 h to 10,000 g/m$^2$/24 h, and the hydrostatic pressure is no less than 1,500 mm.

The first coating, the second coating, and the third coating may each independently be monolayer or multilayer. The multilayer coating is formed by multiple application of the composition.

The third coating may be located between the substrate and the first coating, or between the first coating and the second coating, or above the second coating.

The substrate is preferably wood, plastic, metal, glass, fabric, leather, paper, EVA, rubber, leather, glass fiber, polymer fiber, or graphite fiber, most preferably fabric.

The fabric is preferably wool fabric, cotton fabric, synthetic fabric.

The coating is carried out preferably by spraying, painting, roller coating, dipping, injection, printing or knife coating, most preferably spraying such as air pressure spraying, airless spraying or electrostatic spraying.

The curing process is preferably performed first at a temperature not higher than 100° C., followed by raising the curing temperature to 100° C. to 150° C.

EXAMPLES

Unless otherwise defined, all technical and scientific terms used herein have the same meaning as commonly understood by those skilled in the art to which the present invention belongs. When the definition of a term in the present description conflicts with the meaning as commonly understood by those skilled in the art to which the present invention belongs, the definition described herein shall apply.

Unless otherwise specified, all numerical values expressing amount of ingredients, reaction conditions and the like which are used in the description and claims are to be understood as being modified by the term "about". Accordingly, unless indicated to the contrary, the numerical values and parameters described herein are approximate values which can be varied according to the desired performance obtained as required.

The term "and/or" used herein refers to one or all of the elements mentioned.

The terms "including" and "comprising" used herein cover both the case that there are only the elements mentioned and the case that there are also other elements unmentioned in addition to the elements mentioned.

All percentages in the present invention refer to weight percentage, unless otherwise specified.

The analysis and measurement in the present invention are carried out at 23° C., unless otherwise specified.

The weight of each aqueous dispersion in the present invention refers to the weight including water weight, unless otherwise specified.

The number-average molecular weight of the present invention is determined by gel permeation chromatography using tetrahydrofuran as the mobile phase and control polystyrene standards at 23° C.

The solid content of an aqueous dispersion is measured using HS 153 Moisture Meter from Mettler Toledo according to DIN-EN ISO 3251.

The isocyanate group (NCO) content is determined by volume according to DIN-EN ISO 11909.

The particle size is determined after dilution with deionized water using laser spectroscopy (measured by Zatasizer Nano ZS 3600 Laser Particle Sizer from Malvern Instruments).

The pH value is measured at 23° C. using PB-10 pH Meter from Sartorius, Germany.

The viscosity is measured using DV-II+Pro. Rotational Viscometer from Brookfield according to DIN 53019 at 23° C.

Washing refers to that the coated product or the coated article is washed with water at 30° C. for 40 minutes, and then dried at room temperature; and one time of washing means a process repeating the above washing and drying steps once.

Water vapor transmission rate (WVTR) is the amount of water vapor that is transmitted through a 1 m$^2$ fabric sample within 24 h at a certain temperature and relative humidity under a certain water vapor pressure difference and coating thickness, in g/m$^2$/24 h. The WVTR is measured according to DS2109 TM1 using a water vapor transmission rate meter from British Textile Technology Group, UK. Before washing, when the WVTR value is more than 5,000 g/m$^2$/24 h, the water vapor transmission rate of the coating is considered to be acceptable. After ten times of washing, when the WVTR value is greater than 3,500 g/m$^2$/24 h, it is considered that the water vapor transmission rate of the coating is acceptable, indicating that the coating has good washing resistance.

Hydrostatic pressure, also known as hydrostatic head (HSH), refers to the hydrostatic strength of fabric per unit area, in mm H$_2$O. For example, a hydrostatic head of 4,000 mm means that the fabric per unit area can withstand a maximum of 4 m water pressure without leakage. The HSH is measured at 20° C. according to DIN EN 20811:1992 using a hydrostatic tester from PFAFF. Before washing, when the HSH value is greater than 4,000 mm $H_2O$, the hydrostatic head of the coating is considered to be acceptable. After ten times of washing, when the HSH value is greater than 1,500 mm $H_2O$, the hydrostatic head of the coating is considered to be acceptable, indicating that the washing resistance of the coating is good.

The hand-felt softness test is performed by touching the coated product or the coated article to evaluate it, wherein Grade 5 is the softest and Grade 1 is the hardest. When the hand-felt softness level is Grade 3-5, it is considered that the hand-felt softness of the coating is acceptable.

The anti-sticking test is performed as follows: folding the surface of the coated product or the coated article coated with the composition together, applying a load of 1 kg thereon, placing them in an environment of 95% relative humidity and 70° C. for 24 hours, removing the load, and opening the folded surface to see if there is surface adhesion phenomenon. When the anti-sticking level is Grade 3.5-5, it is considered that the anti-sticking of the coating is acceptable.

Raw Materials and Reagents

| | |
|---|---|
| Desmodur ®H | 1,6-Hexamethylene diisocyanate, available from Covestro Co., Ltd., Germany, used as the polyisocyanate (a1-1). |
| Desmodur ®W | Dicyclohexylmethane diisocyanate, available from Covestro Co., Ltd., Germany, used as the polyisocyanate (a1-1). |
| Desmophen ®3170 | Polyether polyol based on polypropylene oxide and polyethylene oxide, having a functionality of 6, a number-average molecular weight of 3300 g/mol, and an oxyethylene group content of 81 wt %, available from Covestro Co., Ltd., Germany, used as the polyfunctional polyether polyol (a1-2). |
| Desmophen ®PE170HN | Polyester polyol, having an OH value of 66 mg KOH/g, a number-average molecular weight of 1700 g/mol, available from Covestro Co., Ltd., Germany, used as the polymer polyol (a1-3) different from the polyfunctional polyether polyol. |
| Desmophen ®C2200 | Polycarbonate polyol of hexanediol and dimethyl carbonate, having an OH value of 56 mg KOH/g, a number-average molecular weight of 2000 g/mol, available from Covestro Co., Ltd., Germany, used as the polymer polyol (a1-3) different from the polyfunctional polyether polyol. |
| Desmophen ®L300 | Low-functional polyether polyol, having a functionality of 2, a number-average molecular weight of 2000 g/mol, available from Covestro Co., Ltd., Germany, used as the polymer polyol (a1-3) different from the polyfunctional polyether polyol. |
| Desmophen ®3600 | Low-functional polyether polyol, having a functionality of 2, a number-average molecular weight of 2000 g/mol, available from Covestro Co., Ltd., Germany, used as the polymer polyol (a1-3) different from the polyfunctional polyether polyol. |
| Desmophen ®LP112 | Polyoxypropylene glycol, having a functionality of 2, a number-average molecular weight of 1000 g/mol, available from Covestro Co., Ltd., Germany, used as the polymer polyol (a1-3) different from the polyfunctional polyether polyol. |
| LB25 | Monofunctional polyether polyol based on ethylene oxide/propylene oxide, having a number-average molecular weight of 2250 g/mol, available from Covestro Co., Ltd., Germany, used as the polymer polyol (a1-3) different from the polyfunctional polyether polyol. |
| DMPA | 2,2-Dimethylolpropionic acid, available from Aldrich Chemical Company, Germany, used as the isocyanate-reactive component (a2). |
| AAS | Sodium diamino sulfonate $NH_2$—$CH_2CH_2$—NH—$CH_2CH_2$—$SO_3Na$, having a concentration of 45% in water, available from Covestro Co., Ltd., Germany, used as the isocyanate-reactive component (a2). |
| EDA | Ethanediamine, available from Jiaxing Jinyan Chemical Co., Ltd., China, used as the amino-functional compound (a3). |
| DEA | Available from Aldrich Chemical Company, Germany, used as the chain terminator. |
| Imprafix 2794 | A solid content of 38 wt %, a NCO group content of 12.7 wt % (based on the solid content), a viscosity of <1,500 mPa · s, available from Covestro Co., Ltd., used as the hydrophilically modified blocked aliphatic isocyanate crosslinking agent. |
| Imprafix IO 3025 | A solid content of 100 wt %, a NCO group content of 16.2 wt % (based on the solid content), a viscosity of 6,500 ± 1,500 mPa · s, available from Covestro Co., Ltd., used as the hydrophilically modified non-blocked aliphatic isocyanate crosslinking agent. |
| Desmodur 3900 | HDI-based aliphatic trimer, a solid content of 100 wt %, a NCO content of 23.5 wt %, a HDI monomer content of less than 0.25 wt %, a viscosity of about 730 mPa · s (23° C.), a NCO functionality of 3.0-3.5, available from Covestro Co., Ltd., used as the hydrophilically unmodified aliphatic isocyanate crosslinking agent. |
| Desmodur 2802 | A solid content of 40 wt %, a hydrophically modified carbodiimide crosslinking agent having a NCN group content of 4.2 wt %, available from Covestro Co., Ltd. |
| BYK 349 | Wetting leveling agent, available from BYK. |
| Borchigel L75N | Thickener, available from OMG. |
| Acematt TS 100 | Fumed silica, a 10% solution, used as the additive, available from Evonik. |
| Substrate | NE70/24SD*ND70/24SD*110*80, Nylon cloth, Grade-4 waterproof, available from Huamao (Xiamen) Special Material Co., Ltd. |

Preparation of Aqueous Polyurethane Dispersions 1-4

Aqueous Polyurethane Dispersion 1

168.2 g of Desmophen® C2200, 19.2 g of Desmophen® L300, 40 g of Desmophen® 3600, 6.6 g of Desmophen® LP112, 77.6 g of LB25, 5 g of DMPA, and 22.3 g of Desmophen®3170 are heated at 100° C. for 1 hour, and then cooled to 75° C. 13.1 g of Desmodur® W and 61.18 g of Desmodur® H are added to obtain a mixture which is stirred at 100-110° C. to obtain a polyurethane prepolymer when its practical NCO value is lower than its theoretical NCO value. The prepolymer is dissolved in 746 g of acetone at 80° C., followed by cooling to 40° C. A solution of 11.5 g of DEA, 3.3 g of EDA and 108.3 g of water is then metered in. After stirring at 40° C. for 30 min, it is dispersed by adding 902.3 g of water and the solvent is distilled off in vacuum to give the aqueous polyurethane dispersion 1. The aqueous polyurethane dispersion 1 has a solid content of 30.6%, a particle size of 125.4 nm, a viscosity of 272 mPa·s and a pH value of 6.5.

Aqueous Polyurethane Dispersion 2

168.2 g of Desmophen® C2200, 53.2 g of Desmophen® 3600, 77.6 g of LB25, 5 g of DMPA and 29.3 g of Desmophen® 3170 are heated at 100° C. for 1 hour and then cooled to 75° C. 27.13 g of Desmodur® W and 52.18 g of Desmodur® H are added to obtain a mixture which is stirred at 100-110° C. to obtain a polyurethane prepolymer when its practical NCO value is lower than its theoretical NCO value. The prepolymer is dissolved in 746 g of acetone at 80° C., followed by cooling to 40° C. A solution of 11.5 g of DEA, 3.3 g of EDA and 108.3 g of water is then metered in. After stirring at 40° C. for 30 min, it is dispersed by adding 902.3 g of water and the solvent is distilled off in vacuum to give the aqueous polyurethane dispersion 2. The aqueous polyurethane dispersion 2 has a solid content of 30.3%, a particle size of 84.2 nm, a viscosity of 1552 mPa·s and a pH value of 6.1.

Aqueous Polyurethane Dispersion 3 168.2 g of Desmophen® C2200, 19.2 g of Desmophen® L300, 40 g of Desmophen® 3600, 6.6 g of Desmophen® LP112, 77.6 g of LB25, 5 g of DMPA, and 22.3 g of Desmophen® 3170 are heated at 100° C. for 1 hour, and then cooled to 75° C. 54.3 g of Desmodur® W and 34.8 g of Desmodur® H are added to obtain a mixture which is stirred at 100-110° C. to obtain a polyurethane prepolymer when its practical NCO value is lower than its theoretical NCO value. The prepolymer is dissolved in 785.7 g of acetone at 80° C., followed by cooling to 40° C. A solution of 11.5 g of DEA (available from Aldrich Chemical Company, Germany), 4.5 g of EDA and 116.9 g of water is then metered in. After stirring at 40° C. for 30 min, it is dispersed by adding 951.5 g of water and the solvent is distilled off in vacuum to give the aqueous polyurethane dispersion 3. The aqueous polyurethane dispersion 3 has a solid content of 30.5%, a particle size of 84.9 nm, a viscosity of 2467 mPa·s and a pH value of 5.8.

Aqueous Polyurethane Dispersion 4

381 g of Desmophen® PE170HN and 5.5 g of Desmophen® 3170 are heated to 65° C., and 110.66 g of Desmodur® W is added to obtain a mixture. The mixture is stirred at 120° C. to obtain a polyurethane prepolymer when its practical NCO value is lower than its theoretical NCO value. The prepolymer is dissolved in 660.8 g of acetone at 40° C., and a solution of 51.7 g of AAS and 128.94 g of water is then metered in. After stirring for 15 min, it is dispersed by adding 965.11 g of water, and the solvent is distilled off in vacuum to obtain the aqueous polyurethane dispersion 4.

The aqueous polyurethane dispersion 4 has a solid content of 33.14%, a particle size of 108.3 nm, a viscosity of 98 mPa·s and a pH value of 7.73.

Monolayer Coating

In a film stretching apparatus consisting of two polishing rolls (with the spacing between the rolls precisely adjustable), a substrate is placed between the upper and lower rolls. A clearance gauge is used to adjust the spacing between the substrate and the upper roll to be 0.1 mm. This spacing corresponds to the wet film thickness of the resulting coating and can be adjusted depending on the desired thickness of each coating.

Table 1 shows the composition of the coating compositions of Example 1 and Comparative Examples 1-2. The components are mixed to form the corresponding coating composition. The viscosity of each coating composition obtained in the Example and Comparative Examples is adjusted to be 2,000-4,000 mPa·s (via Borchi Gel L75N). The coating composition is poured into the spacing between the substrate and the upper roll, and the coating knife is pulled horizontally, thereby forming a wet film on the substrate, which is then dried at 70° C. for 1 min, at 90° C. for 1 min and at 150° C. for 1.5 min to give a dry monolayer coating. The properties of each monolayer coating tested are listed in Table 2.

TABLE 1

Composition of the coating compositions in Example 1 and Comparative Examples 1-2.

| Composition of coating composition | Example 1 | Comparative Example 1 | Comparative Example 2 |
|---|---|---|---|
| Aqueous polyurethane dispersion 1/g | | 100 | |
| Aqueous polyurethane dispersion 3/g | 100 | | |
| Aqueous polyurethane dispersion 4/g | | | 100 |
| Imprafix 2794/g | 8 | 8 | 8 |
| BYK 349/g | 0.2 | 0.2 | 0.2 |
| Borchigel L 75N/g | 0.5 | 0.5 | 0.5 |
| Coating spacing/mm | 0.1 | 0.1 | 0.1 |

TABLE 2

Coating performance of Example 1 and Comparative Examples 1-2

| | Before washing | | After washing ten times | | | |
|---|---|---|---|---|---|---|
| | HSH (mm $H_2O$) | WVTR (g/$m^2$/24 h) | HSH (mm $H_2O$) | WVTR (g/$m^2$/24 h) | Hand-felt softness | Anti-sticking |
| Example 1 | >7000 | 5497 | >7000 | 8372 | 4 | 2 |
| Comparative Example 1 | 2800 | 8553 | 500 | 8068 | 5 | 2 |
| Comparative Example 2 | 5000 | 11396 | 0 | 3000 | 1 | 4 |

It can be seen from Table 2 that the HSH values, the WVTR values, the hand-felt softness indexes and the anti-sticking indexes of the coating formed by the coating composition of Example 1 before and after washing are better than those in Comparative Examples 1 and 2. These results demonstrate that when the aqueous polyurethane dispersion is obtained by a reaction comprising an cycloaliphatic isocyanate, especially a cycloaliphatic isocyanate containing at least two aliphatic rings, in particular dicyclohexylmethane diisocyanate, and the amount of dicyclohexylmethane diisocyanate is 25 wt % to 90 wt % based on the total amount of the polyisocyanates, the coating formed by the coating composition containing the same has good hand-felt softness, anti-sticking and washing resistance, and therefore meets the industrial demand.

Multilayer Coating

In a film stretching apparatus consisting of two polishing rolls (with the spacing between the rolls precisely adjustable), a substrate is placed between the upper and lower rolls. A clearance gauge is used to adjust the spacing between the substrate and the upper roll to be 0.05 mm. This spacing corresponds to the wet film thickness of the resulting coating and can be adjusted depending on the desired thickness of each coating.

Table 3 shows the composition of the coating systems of Examples 2-11, and Table 4 shows the composition of the comparative coating systems of Comparative Examples 3-16. The components of the first composition are mixed to form the corresponding first composition, and the components of the second composition are mixed to form the corresponding second composition. The viscosity of each of the first compositions and the second compositions obtained in the Examples and Comparative Examples is adjusted to be 2000-4,000 mPa·s (via Borchi Gel L75N). The first composition is poured into the spacing between the substrate and the upper roll, and the coating knife is pulled horizontally, thereby forming a wet film on the substrate, which is then dried at 70° C. for 1 min, at 90° C. for 1 min and at 150° C. for 1.5 min to give a dry monolayer coating. The second composition is poured into the spacing between the coating surface of the substrate coated with the first coating and the upper roll, and the coating knife is pulled horizontally, thereby forming a wet film on the surface of the first coating, which is then dried at 70° C. for 1 min, at 90° C. for 1 min and at 150° C. for 1.5 min to give a dry second coating. The above steps can be repeated if it is desired to obtain a coated article containing more than two coatings. The properties of each coating tested are listed in Table 5.

TABLE 3

Composition of the coating systems in Examples 2-11.

| | Example 2 | Example 3 | Example 4 | Example 5 | Example 6 | Example 7 | Example 8 | Example 9 | Example 10 | Example 11 |
|---|---|---|---|---|---|---|---|---|---|---|
| First composition | | | | | | | | | | |
| Aqueous polyurethane dispersion 1/g | | | | | | | | | | |
| Aqueous polyurethane dispersion 3/g | 100 | 100 | 100 | 100 | 100 | 100 | 100 | | 100 | 100 |
| Aqueous polyurethane dispersion 4/g | | | | | | | | | | |
| Aqueous polyurethane dispersion 2/g | | | | | | | | 100 | | |
| Imprafix 2794/g | 8 | 5 | 8 | 8 | | | 3 | 8 | 5 | |
| Imprafix IO 3025/g | | | | | 1.5 | 1.5 | | | | 1.8 |
| Desmodur 2802/g | | | | | | | 3 | | | |
| Desmodur 3900/g | | | | | | | | | | 0.2 |
| BYK 349/g | 0.2 | 0.2 | 0.2 | 0.2 | 0.2 | 0.2 | 0.2 | 0.2 | 0.2 | 0.2 |
| Borchigel L 75N/g | 0.5 | 0.5 | 0.5 | 0.5 | 0.5 | 0.5 | 0.5 | 0.5 | 0.5 | 0.5 |
| Coating spacing/mm | 0.05 | 0.05 | 0.05 | 0.05 | 0.05 | 0.05 | 0.05 | 0.05 | 0.05 | 0.05 |
| Second composition | | | | | | | | | | |
| Aqueous polyurethane dispersion 4/g | 100 | 100 | 100 | 100 | 100 | 100 | 100 | 100 | 100 | 100 |
| Aqueous polyurethane dispersion 3/g | | | | | | | | | | |
| Imprafix 2794/g | 5 | 3 | 3 | 3 | 3 | 6 | 3 | 3 | | |
| Acematt TS 100/g | | | | 30 | 30 | 30 | | | | |
| Imprafix IO 3025/g | | | | | | | | | 1.5 | 1.8 |
| Desmodur 3900/g | | | | | | | | | | 0.2 |
| BYK 349/g | 0.2 | 0.2 | 0.2 | 0.2 | 0.2 | 0.2 | 0.2 | 0.2 | 0.2 | 0.2 |
| Borchigel L 75N/g | 2 | 2 | 2 | 2 | 2 | 2 | 2 | 2 | 2 | 2 |
| Coating spacing/mm | 0.05 | 0.05 | 0.05 | 0.05 | 0.05 | 0.05 | 0.05 | 0.05 | 0.05 | 0.05 |

TABLE 4

Composition of the comparative coating systems in Comparative Examples 3-16.

| | Comp. Example 3 | Comp. Example 4 | Comp. Example 5 | Comp. Example 6 | Comp. Example 7 | Comp. Example 8 | Comp. Example 9 | Comp. Example 10 |
|---|---|---|---|---|---|---|---|---|
| *Comparative first composition* | | | | | | | | |
| Aqueous polyurethane dispersion 1/g | | | | | | | 100 | |
| Aqueous polyurethane dispersion 3/g | 100 | | 100 | 100 | 100 | 100 | | 100 |
| Aqueous polyurethane dispersion 4/g | | 100 | | | | | | |
| Aqueous polyurethane dispersion 2/g | | | | | | | | |
| Imprafix 2794/g | 0 | 0 | 3 | 5 | 8 | 3 | 8 | |
| Imprafix IO 3025/g | | | | | | | | |
| Desmodur 2802/g | | | | | | | | |
| Desmodur 3900/g | | | | | | | | |
| BYK 349/g | 0.2 | 0.2 | 0.2 | 0.2 | 0.2 | 0.2 | 0.2 | 0.2 |
| Borchigel L 75N/g | 0.5 | 0.5 | 0.5 | 0.5 | 0.5 | 0.5 | 0.5 | 0.5 |
| Coating spacing/mm | 0.05 | 0.05 | 0.05 | 0.05 | 0.05 | 0.05 | 0.05 | 0.05 |
| *Comparative second composition* | | | | | | | | |
| Aqueous polyurethane dispersion 4/g | | 100 | 100 | 100 | 100 | 100 | 100 | 100 |
| Aqueous polyurethane dispersion 3/g | 100 | | | | | | | |
| Imprafix 2794/g | | | | | 1 | 3 | 3 | |
| Acematt TS 100/g | | | | | | | | |
| Imprafix IO 3025/g | | | | | | | | |
| Desmodur 3900/g | | | | | | | | |
| BYK 349/g | 0.2 | 0.2 | 0.2 | 0.2 | 0.2 | 0.2 | 0.2 | 0.2 |
| Borchigel L 75N/g | 2 | 2 | 2 | 2 | 2 | 2 | 2 | 2 |
| Coating spacing/mm | 0.05 | 0.05 | 0.05 | 0.05 | 0.05 | 0.05 | 0.05 | 0.05 |

| | Comp. Example 11 | Comp. Example 12 | Comp. Example 13 | Comp. Example 14 | Comp. Example 15 | Comp. Example 16 |
|---|---|---|---|---|---|---|
| *Comparative first composition* | | | | | | |
| Aqueous polyurethane dispersion 1/g | | | | | | |
| Aqueous polyurethane dispersion 3/g | | 100 | 100 | 100 | | 100 | 100 |
| Aqueous polyurethane dispersion 4/g | | | | 100 | | |
| Aqueous polyurethane dispersion 2/g | | | | | | |
| Imprafix 2794/g | | | 5 | | | |
| Imprafix IO 3025/g | | | | | 1 | 0.2 |
| Desmodur 2802/g | | | | | | |

TABLE 4-continued

Composition of the comparative coating systems in Comparative Examples 3-16.

| | | | | | | |
|---|---|---|---|---|---|---|
| Desmodur 3900/g | | | | | 1 | 1.8 |
| BYK 349/g | 0.2 | 0.2 | 0.2 | 0.2 | 0.2 | 0.2 |
| Borchigel L 75N/g | 0.5 | 0.5 | 0.5 | 0.5 | 0.5 | 0.5 |
| Coating spacing/mm | 0.05 | 0.05 | 0.05 | 0.05 | 0.05 | 0.05 |
| Comparative second composition | | | | | | |
| Aqueous polyurethane dispersion 4/g | 100 | 100 | 100 | | 100 | 100 |
| Aqueous polyurethane dispersion 3/g | | | | 100 | | |
| Imprafix 2794/g | 1 | 6 | | | | |
| Acematt TS 100/g | | | | | | |
| Imprafix IO 3025/g | | | 0.5 | | 1 | 0.2 |
| Desmodur 3900/g | | | | | 1 | 1.8 |
| BYK 349/g | 0.2 | 0.2 | 0.2 | 0.2 | 0.2 | 0.2 |
| Borchigel L 75N/g | 2 | 2 | 2 | 2 | 2 | 2 |
| Coating spacing/mm | 0.05 | 0.05 | 0.05 | 0.05 | 0.05 | 0.05 |

TABLE 5

Coating performance of Examples 2-11 and Comparative Examples 3-16.

| | Before washing | | After washing ten times | | | |
|---|---|---|---|---|---|---|
| | HSH (mm $H_2O$) | WVTR (g/m$^2$/24 h) | HSH (mm $H_2O$) | WVTR (g/m$^2$/24 h) | Hand-felt softness | Anti-sticking |
| Example 2 | >7000 | 5874 | 4500 | 3870 | 3 | 4 |
| Example 3 | >7000 | 6901 | 3700 | 6836 | 4 | 4 |
| Example 4 | >7000 | 5858 | >7000 | 7041 | 4 | 4 |
| Example 5 | >7000 | 5899 | >7000 | 8454 | 4 | 4.5 |
| Example 6 | >7000 | 8011 | 2200 | 7526 | 4 | 4.5 |
| Example 7 | >7000 | 8528 | 3000 | 6704 | 4 | 4.5 |
| Example 8 | 4000 | 7649 | 2800 | 7997 | 4 | 4 |
| Example 9 | 4000 | 5439 | 1800 | 4912 | 3 | 4 |
| Example 10 | 7000 | 6384 | 5900 | 8323 | 4 | 4 |
| Example 11 | 4200 | 5817 | 2700 | 4009 | 4 | 4 |
| Comparative Example 3 | 2200 | 7986 | 0 | 13000 | 5 | 1 |
| Comparative Example 4 | 5200 | 14197 | 0 | 20000 | 2 | 3.5 |
| Comparative Example 5 | >7000 | 8413 | 500 | 10771 | 4 | 3.5 |
| Comparative Example 6 | >7000 | 7559 | 0 | 8500 | 4 | 3.5 |
| Comparative Example 7 | >7000 | 6499 | 20 | 6302 | 4 | 3.5 |
| Comparative Example 8 | >7000 | 6959 | 190 | 8282 | 4 | 4 |
| Comparative Example 9 | 2700 | 4346 | 50 | 4675 | 3 | 4 |
| Comparative Example 10 | 1200 | 9424 | 0 | 0 | 4.5 | 3.5 |
| Comparative Example 11 | 1300 | 8832 | 0 | 0 | 4.5 | 3.5 |
| Comparative Example 12 | 1300 | 7279 | 900 | 9917 | 4.5 | 4 |
| Comparative Example 13 | 6200 | 7583 | 500 | 9112 | 4 | 3.5 |
| Comparative Example 14 | 2800 | 13540 | 0 | 0 | 2 | 2 |

TABLE 5-continued

Coating performance of Examples 2-11 and Comparative Examples 3-16.

|  | Before washing | | After washing ten times | | | |
|---|---|---|---|---|---|---|
|  | HSH (mm H$_2$O) | WVTR (g/m$^2$/24 h) | HSH (mm H$_2$O) | WVTR (g/m$^2$/24 h) | Hand-felt softness | Anti-sticking |
| Comparative Example 15 | 4800 | 3032 | 1900 | 2617 | 4 | 4 |
| Comparative Example 16 | 2700 | 2198 | 59 | 2510 | 4 | 4 |

It can be seen from Examples 2-11 that the coating formed by the coating system of the present invention not only has good hand-felt softness and anti-sticking, but also has good washing resistance.

It can be seen from Comparative Examples 3-4 and Comparative Example 14 that when the first composition and the second composition of the coating system do not comprise any crosslinking agent, the coating formed by such a coating system has poor washing resistance, hand-felt softness and anti-sticking.

It can be seen from Comparative Examples 5-6 and 10-12 that when one of the first composition and the second composition does not comprise the crosslinking agent of the present invention, the coating formed by such a coating system cannot have good hand-felt softness, anti-sticking and washing resistance at the same time.

When comparing Comparative Example 7 with Example 2, Comparative Example 13 with Example 10, Comparative Example 8 with Example 3, it can be seen that the reactive group content in the compositions of the coating system affects the washing resistance of the coating formed by such a coating system.

It can be seen from Comparative Example 9 and Example 9 that when the aqueous polyurethane dispersion contained in the first composition of the coating system is prepared from no less than 25 wt % of a cycloaliphatic isocyanate, the coating formed by the coating system containing the same not only has good hand-felt softness and anti-sticking, but also has good washing resistance.

It can be seen from Comparative Examples 15-16 and Example 11 that when the first composition and the second composition of the coating system each contain a non-hydrophilic crosslinking agent in a content of 50 wt % or more based on the crosslinking agent content, the coating formed by the coating system containing the same still has good hand-felt softness and anti-sticking, but does not have good washing resistance. When the first composition and the second composition of the coating system each contain a non-hydrophilic crosslinking agent in a content of less than 50 wt % based on the crosslinking agent content, the coating formed by the coating system containing the same has good hand-felt softness, anti-sticking and washing resistance.

It will be apparent to those skilled in the art that the present invention is not limited to the specific details described above, and that the present invention may be embodied in other specific forms without departing from the spirit or essential characteristics of the present invention. The described Examples are therefore to be considered in all respects as illustrative and not restrictive, so that the scope of the invention is indicated by the appended claims rather than the foregoing description; and therefore any change should be regarded as belonging to the invention, as long as it falls within the meaning and scope of equivalents of the claims.

The invention claimed is:

1. A coating composition, comprising:
(A) at least one aqueous polyurethane dispersion and optionally at least one aqueous polyacrylate dispersion, wherein the aqueous polyurethane dispersion comprises at least one polyurethane polymer (a), wherein the polyurethane polymer (a) is obtained by a reaction comprising at least one polyurethane prepolymer (a1) and at least one isocyanate-reactive component (a2), wherein the polyurethane prepolymer (a1) is obtained by a reaction comprising the following components:
(a1-1) at least one polyisocyanate having an isocyanate functionality of no less than 2, the at least one polyisocyanate comprising a cycloaliphatic polyisocyanate having at least two aliphatic rings, wherein the cycloaliphatic polyisocyanate is present in an amount of from 25 wt % to 90 wt %, based on a total amount of the polyisocyanate (a1-1) being 100 wt %,
(a1-2) at least one polyfunctional polyether polyol having a hydroxyl functionality of no less than 3, wherein the polyfunctional polyether polyol is present in an amount of from 1 wt % to 20 wt %, based on a total amount of the components for preparing the polyurethane prepolymer being 100 wt %, and
(a1-3) optionally a polymer polyol different from the polyfunctional polyether polyol having a hydroxyl functionality of no less than 3;
(B) at least one crosslinking agent; and
(C) optionally an additive,
optionally wherein the isocyanate-reactive component (a2) comprises anionic hydrophilic agents and/or potentially anionic hydrophilic agents.

2. The coating composition according to claim 1, wherein the at least one polyfunctional polyether polyol (a1-2) having a hydroxyl functionality of no less than 3 is obtained by a reaction comprising at least one ethylene oxide and at least one initiator,
optionally wherein the at least one polyfunctional polyether polyol (a1-2) having a hydroxyl functionality of no less than 3 has a structure according to formula I:

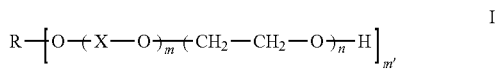

wherein
m is 0-50,
n is 1-50,
m' is no less than 3,
X is one or more of the following: 1,3-propylidene, 1,2-isopropylidene (—CH(CH$_3$)CH$_2$—), 2,2-propylidene (—C(CH$_3$)$_2$—), 1,1-butylidene, 1,2-butylidene, 2,2-butylidene, 1,3-butylidene, 1,4-butylidene, 1,2-pentylidene, 1,3-pentylidene, 1,4-pentylidene, 1,5-pentylidene, 1,6-hexylidene, 1,7-heptylidene, 1,8-octylidene, 1,9-nonylidene, 1,10-decylidene, 1,11-undecylidene, 1,12-dodecylidene, 1,2-cyclopentylidene, 1,2-cyclohexylidene, 1,2-cycloheptylidene, 1,2-cyclooctylidene, 1,2-styrylidene, 1,2-methylstyrylidene, and 1,2-pinanylidene, and R is C$_y$H$_z$, wherein y is equal to the number of carbon atoms of the initiator, and z is an integer that renders formula I established, and optionally wherein the initiator comprises monosaccharides, oligosaccharides, polysaccharides, pentaerythritol, dipentaerythritol, tripentaerythritol, trimethylolethane, trimethylolpropane, sorbitol, a cyclic polyol, an aromatic hydroxy compound, a polyamine, a compound having carboxyl groups, a compound having hydroxyl and carboxyl groups, or a combination thereof.

3. The coating composition according to claim 1, wherein the at least one polyfunctional polyether polyol (a1-2) having a hydroxyl functionality of no less than 3 has a number-average molecular weight of 500 g/mol to 12,000 g/mol, or wherein the at least one polyfunctional polyether polyol (a1-2) having a hydroxyl functionality of no less than 3 is present in an amount of from 1 wt % to 15 wt %, based on the total amount of the components for preparing the polyurethane prepolymer being 100 wt %, or both.

4. The coating composition according to claim 1, wherein the crosslinking agent (B) is an aliphatic and/or aromatic isocyanate derivative containing a reactive group, wherein the reactive group is capable of reacting with a group containing an active hydrogen, and the group containing the active hydrogen comprises a hydroxyl group, a carboxyl group, a mercapto group, an amino group, or a combination thereof, optionally wherein the reactive group is present in an amount of from 0.1 wt % to 2 wt %, based on a total amount of the coating composition being 100 wt %, and optionally wherein the crosslinking agent (B) is hydrophilically modified.

5. The coating composition according to claim 1, wherein the crosslinking agent (B) comprises a blocked aliphatic polyisocyanate, a non-blocked aliphatic polyisocyanate, a carbodiimide, a melamine-type crosslinking agent, an aziridine-type crosslinking agent, a polyepoxy crosslinking agent, or a combination thereof.

6. The coating composition according to claim 1, wherein the polyisocyanate (a1-1) comprises an aliphatic polyisocyanate and/or wherein the cycloaliphatic polyisocyanate is dicyclohexylmethane diisocyanate.

7. The coating composition according to claim 1, wherein the polymer polyol (a1-3) comprises polycarbonate polyols, polyester polyols, low-functional polyether polyols, or a combination thereof, and optionally wherein a weight ratio of the polyfunctional polyether polyol (a1-2) to the polycarbonate polyol is 1:4 to 1:10.

8. The coating composition according to claim 1, wherein the aqueous polyurethane dispersion is present in an amount of from 50 wt % to 99 wt %, based on a total amount of the coating composition being 100 wt %.

9. A method for preparing a coating composition according to claim 1, wherein the method comprises: mixing the aqueous polyurethane dispersion and/or the aqueous polyacrylate dispersion (A), the crosslinking agent (B) and the optional additive (C) in any desired manner.

10. The method according to claim 9, wherein the aqueous polyurethane dispersion (A) is prepared by:
    (1) reacting a mixture comprising at least one polyisocyanate (a1-1), at least one polyfunctional polyether polyol (a1-2) having a hydroxyl functionality of no less than 3, and optionally a polymer polyol (a1-3) different from the polyfunctional polyether polyol having a hydroxyl functionality of no less than 3 to obtain the polyurethane prepolymer (a1);
    (2) reacting a mixture comprising at least one polyurethane prepolymer (a1) and at least one isocyanate-reactive component (a2) to obtain the polyurethane polymer (a); and
    (3) introducing water before, during, or after step (2) to obtain the aqueous polyurethane dispersion (A).

11. A coated product comprising a substrate and a coating formed by:
    coating the coating composition according to claim 1 on the substrate, and/or
    curing the coating composition according to claim 1 on the substrate.

12. A method for producing a coated product, comprising coating a coating composition according to claim 1 on a substrate and curing it to form a coating.

13. A coating system, comprising:
    a first composition, the first composition being the coating composition according to claim 1, wherein the polymer polyol (a1-3) different from the polyfunctional polyether polyol having a hydroxyl functionality of no less than 3 comprises at least one polycarbonate polyol, and a weight ratio of the polyfunctional polyether polyol (a1-2) having a hydroxyl functionality of no less than 3 to the polycarbonate polyol is 1:4 to 1:10, wherein the first composition is used to form a first coating, and
    a second composition, the second composition being the coating composition according to claim 1, wherein the polymer polyol (a1-3) different from the polyfunctional polyether polyol having a hydroxyl functionality of no less than 3 comprises at least one polyester polyol, and a weight ratio of the polyfunctional polyether polyol (a1-2) having a hydroxyl functionality of no less than 3 to the polyester polyol is 1:20 to 1:80, wherein the second composition is used to form a second coating.

14. The coating system according to claim 13, wherein the polyisocyanate (a1-1) of the first composition further comprises at least one aliphatic polyisocyanate.

15. The coating system according to claim 13, wherein a weight ratio of the polyfunctional polyether polyol (a1-2) having a hydroxyl functionality of no less than 3 to the polycarbonate polyol is 1:4 to 1:8, or wherein a weight ratio of the polyfunctional polyether polyol (a1-2) having a hydroxyl functionality of no less than 3 to the polyester polyol is 1:30 to 1:70, or both.

16. The coating system according to claim 13, wherein the crosslinking agent (B) of the first composition comprises at least one blocked aliphatic polyisocyanate and at least one carbodiimide, and optionally wherein a weight ratio of the blocked aliphatic polyisocyanate to the carbodiimide is 1:1 to 4:1.

17. A coated article comprising a substrate and a coating formed by:

coating the coating system according to claim 13 on the substrate, and/or curing the coating system according to claim 13 on the substrate.

18. A method for producing a coated article, comprising coating the coating system according to claim 13 on a substrate and curing it to form a coating, optionally wherein coating the coating system on the substrate is carried out as follows:

applying the first composition onto a substrate surface to form a first coating; and applying the second composition onto a surface of the first coating to form a second coating.

* * * * *